(12) United States Patent
Lu et al.

(10) Patent No.: US 10,162,949 B2
(45) Date of Patent: Dec. 25, 2018

(54) DYNAMIC TOKEN HAVING LOG FUNCTION AND WORKING METHOD THEREFOR

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 98 days.

(21) Appl. No.: 15/502,832

(22) PCT Filed: Jan. 14, 2015

(86) PCT No.: PCT/CN2015/070680
§ 371 (c)(1),
(2) Date: Feb. 9, 2017

(87) PCT Pub. No.: WO2016/082317
PCT Pub. Date: Jun. 2, 2016

(65) Prior Publication Data
US 2017/0249449 A1    Aug. 31, 2017

(30) Foreign Application Priority Data
Nov. 25, 2014   (CN) .......................... 2014 1 0685654

(51) Int. Cl.
G06F 21/31       (2013.01)
G06F 3/023       (2006.01)
(Continued)

(52) U.S. Cl.
CPC ............ *G06F 21/31* (2013.01); *G06F 3/0233* (2013.01); *G06F 21/34* (2013.01); *H04L 29/06* (2013.01)

(58) Field of Classification Search
CPC ........ G06F 21/31; G06F 3/0233; G06F 21/34; H04L 29/06
See application file for complete search history.

(56) References Cited

U.S. PATENT DOCUMENTS 8,443,432 B2    5/2013   Lu et al.
9,601,120 B2 *  3/2017   Lu .......................... H04L 9/3228
(Continued)

FOREIGN PATENT DOCUMENTS

CN      103227720 A  *  7/2013
CN      103391195 A  *  11/2013
CN      103684785 A  *  3/2014

*Primary Examiner* — Yonas A Bayou
(74) *Attorney, Agent, or Firm* — Hammer & Associates, P.C.

(57) ABSTRACT

A dynamic token having a log function and a working method therefor. After the dynamic token determines that a key interrupt flag is set, a keyboard is scanned to obtain a first key value, and a currently pressed key is judged according to the first key value; if the currently pressed key is a first key, a dynamic password and a log corresponding to the dynamic password are generated; the dynamic password is stored in a display data buffer area, and the log is stored in a log storage area; key interrupt is enabled; and if the currently pressed key is a second key or a combination of a third key and a fourth key, the log is read from the log storage area, and the read log is stored in the display data buffer area. According to the present invention, by recording information related to the completed identity authentication by means of a dynamic token, a user can recheck whether the completed identity authentication is identity authentication completed by himself/herself, thereby improving the security of an identity authentication mechanism and the dynamic token which uses a dynamic password.

20 Claims, 18 Drawing Sheets

(51) Int. Cl.
*H04L 29/06* (2006.01)
*G06F 21/34* (2013.01)

(56) References Cited

U.S. PATENT DOCUMENTS

| | | | |
|---|---|---|---|
| 9,703,937 B2* | 7/2017 | Vrhel | G06F 21/121 |
| 9,838,385 B2* | 12/2017 | DeLuca | H04L 63/083 |
| 9,860,059 B1* | 1/2018 | Duane | H04L 63/0838 |
| 2006/0265340 A1* | 11/2006 | Ziv | G06Q 20/341 |
| | | | 705/76 |
| 2007/0186105 A1* | 8/2007 | Bailey | H04L 63/0492 |
| | | | 713/168 |
| 2007/0234401 A1* | 10/2007 | Eldar | H04L 12/12 |
| | | | 726/2 |
| 2011/0072499 A1* | 3/2011 | Lin | G06F 21/35 |
| | | | 726/6 |
| 2011/0258704 A1* | 10/2011 | Ichnowski | H04L 67/02 |
| | | | 726/26 |
| 2011/0302646 A1* | 12/2011 | Ronda | H04L 9/3213 |
| | | | 726/9 |
| 2012/0078639 A1* | 3/2012 | Kumar | G10L 15/30 |
| | | | 704/273 |
| 2012/0154181 A1* | 6/2012 | Rhee | H03M 11/08 |
| | | | 341/26 |
| 2014/0052995 A1* | 2/2014 | Hu | G06F 21/45 |
| | | | 713/184 |

* cited by examiner

DYNAMIC TOKEN HAVING LOG FUNCTION AND WORKING METHOD THEREFOR

FIELD OF THE INVENTION

The present invention relates to a dynamic token with log function and a method therefor, which belongs to information security field.

PRIOR ART

A dynamic token is a device for generating dynamic password, which is widely used in fields, such as online bank, telecommunication operator and e-administration, etc. The dynamic password generated by the dynamic token can be used for identity authentication, which can improve security of identification effectively.

In prior art, the dynamic password is a combination of random numbers which is related to time and unpredictably. Each dynamic password can only be used for one time and the dynamic password can not be rechecked and confirmed after the dynamic password being used.

In process of realizing the present invention, the inventor founds that the prior art has following disadvantages:

because the dynamic password can only be used for one time, the dynamic token will power off automatically after displaying the dynamic password for a while, generally for dozens of seconds; a user can not check any information related to a completed identity authentication through the dynamic token and can not confirm that the completed identity authentication is completed by the token itself. Therefore, identification authentication mechanism using dynamic password in the prior art has security defection.

SUMMARY OF THE INVENTION

The object of the present invention is to provide a dynamic token with log function and a working method therefor, which can overcome the security defection in identification authentication mechanism using dynamic password in the prior art.

Therefore, according to one aspect of the present invention, a working method for a dynamic token with log function is provided, which comprises the following steps:

S1) being powering up, by the dynamic token, executing initializing operation, initializing function of general interruption and key waking up function;

S2) determining, by the dynamic token, whether a set interruption flag exists, if yes, executing Step S3; otherwise, keeping on executing Step S2;

S3) determining, by the dynamic token, the set interruption flag, if the set interruption flag is timer interruption flag, executing Step S4; if the set interruption flag is key interruption flag, executing Step S5;

S4) resetting, by the dynamic token, the timer interruption flag and going back to Step S2;

S5) shutting down, by the dynamic token, the key interruption, scanning a keyboard and obtaining a first key value;

S6) determining, by the dynamic token, a press key which is currently pressed down according to the first key value, if the press key which is currently pressed down is a first press key, executing Step S7; if the press key which is currently pressed down is a second press key or combination of a third press key and a fourth press key, executing Step S8;

S7) generating, by the dynamic token, a dynamic password and a log corresponding to the dynamic password, storing the dynamic password in a display data buffer, storing the log in a log storage area, initializing the key interruption and going back to Step S2; and S8) reading, by the dynamic token, the log from the log storage area, storing the read log into the display data buffer, activate the key interruption and going back to Step S2.

According to another aspect of the present invention, a dynamic token with log function is provided, which comprises:

an initializing module configured to, after being powering up, execute initializing operation, activating general interruption and press key waking function;

a first determining module configured to determine whether a set interruption flag exists; a second determining module configured to, after the first determining module determines that the set interruption flag exists, determine the set interruption flag;

a resetting module configured to, after the second determining module determines that the set interruption flag is timer interruption flag, resetting the timer interruption flag and trigger the first determining module to determine whether the set interruption flag exists;

a first obtaining module configured to, after the second determining module determines that the set interruption flag is key interruption flag, shut down the key interruption, scan a keyboard and obtain a first key value;

a third determining module configured to determine a press key which is currently pressed down according to the first key value obtained by the first obtaining module;

a first processing module configured to, after the third determining module determines that the press key which is currently pressed down is a first press key, generate a dynamic password and a log corresponding to the dynamic password, store the dynamic password in a display data buffer, store the log in a log storage area, initialize the key interruption and trigger the first determining module to determine whether the set interruption flag exists; and a second processing module configure to, when the third determining module determines that the press key which is currently pressed down is the second press key or combination of the third press key and the fourth press key, read a log from the log storage area, store the read log in the display data buffer, activate the key interruption and trigger the first determining module to determine whether a set interruption flag exists.

According to the present invention, after generating the dynamic password, the dynamic token generates and records a log corresponding to the dynamic password for the user to check so as to record information related to the completed identity authentication. In this way, the user can recheck whether the completed identity authentication is completed by the dynamic token itself, therefore the security of the identity authentication mechanism using the dynamic password and the dynamic token is improved.

BRIEF DESCRIPTION OF THE ACCOMPANYING DRAWINGS

FIG. 1 to FIG. 14 present flow diagrams of a work method for a dynamic token with log function in embodiments of the present invention;

DETAILED DESCRIPTION OF PRESENT INVENTION

Figure 1:
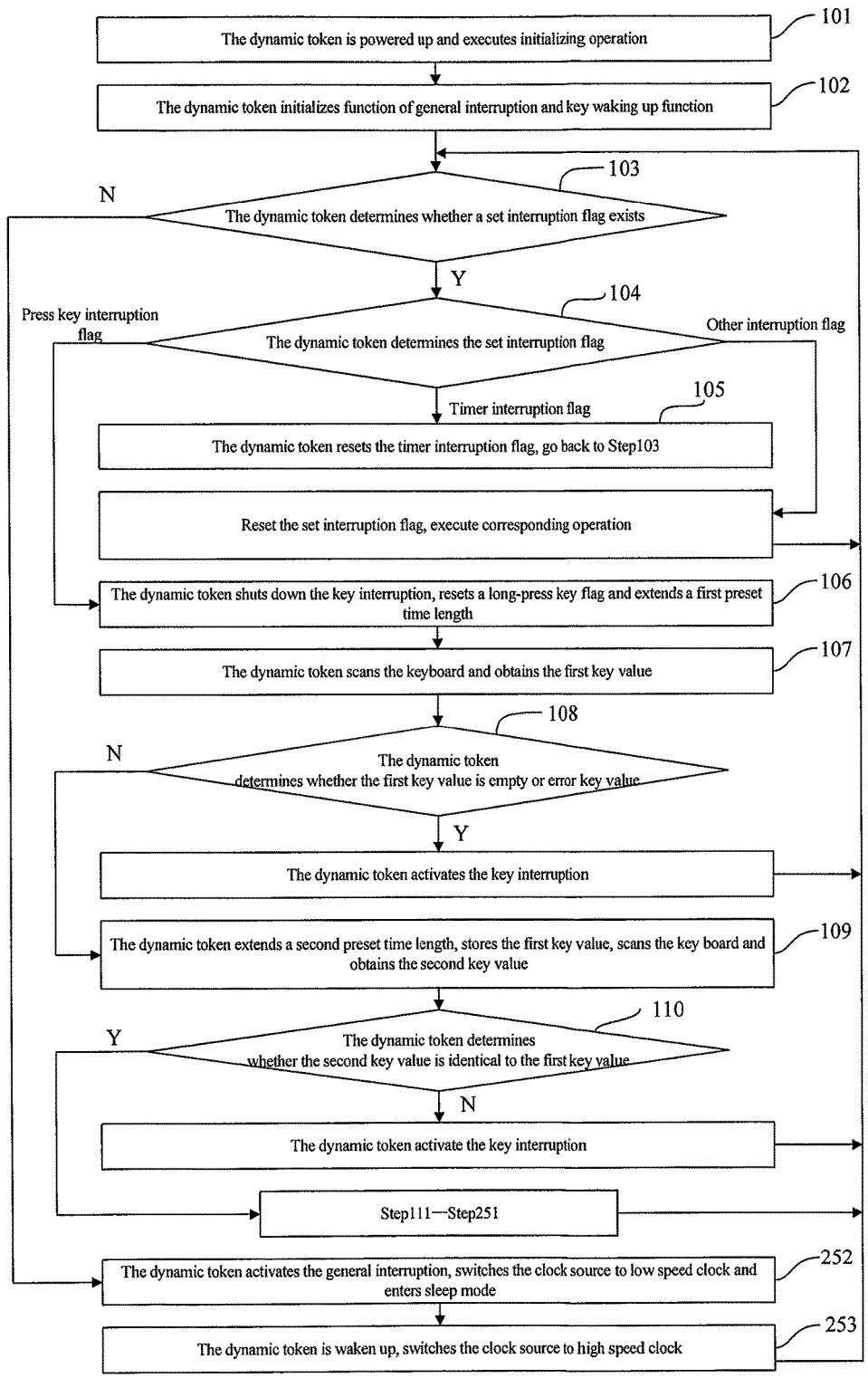
Figure 2:
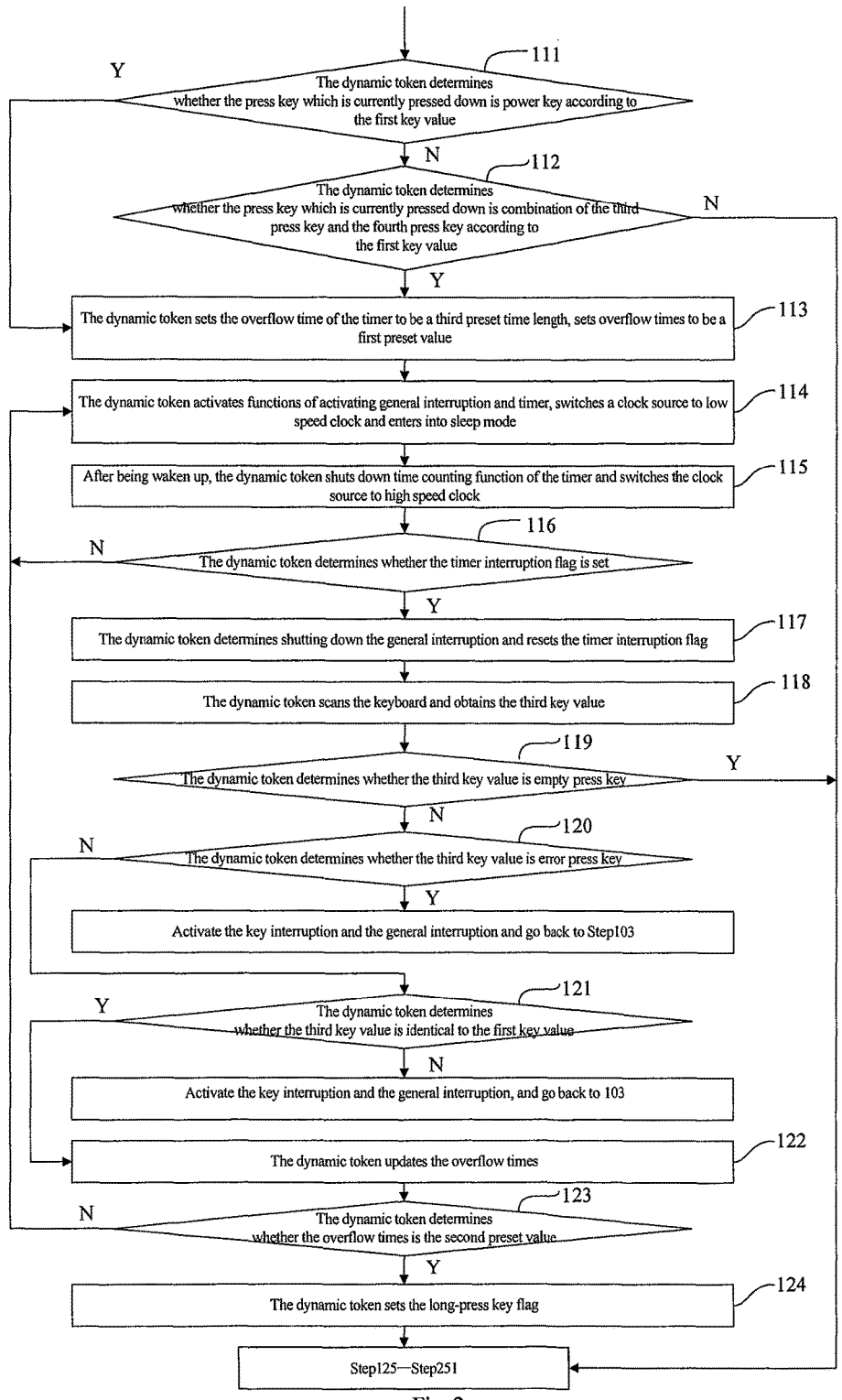
Figure 3:
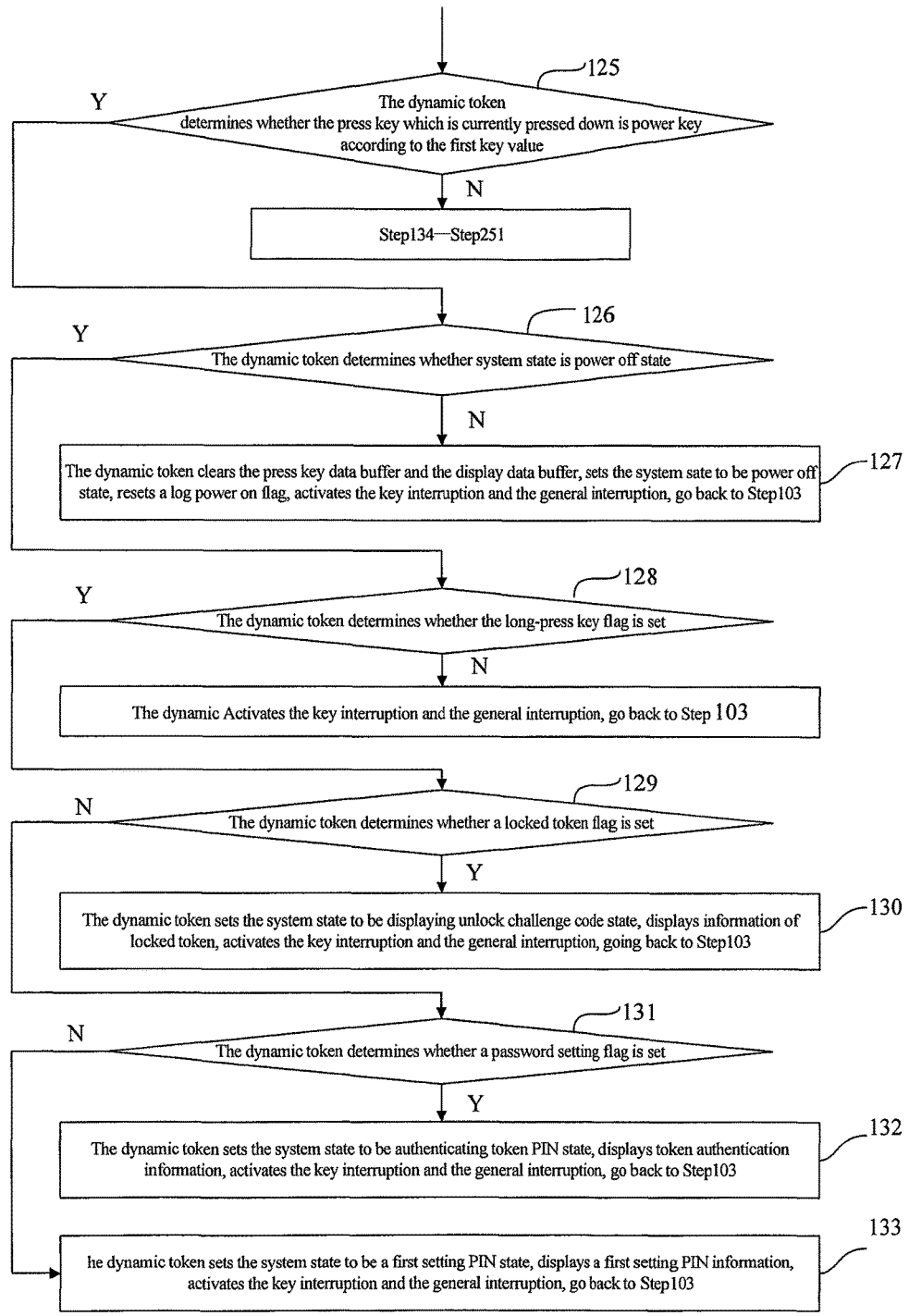
Figures 1, 4:
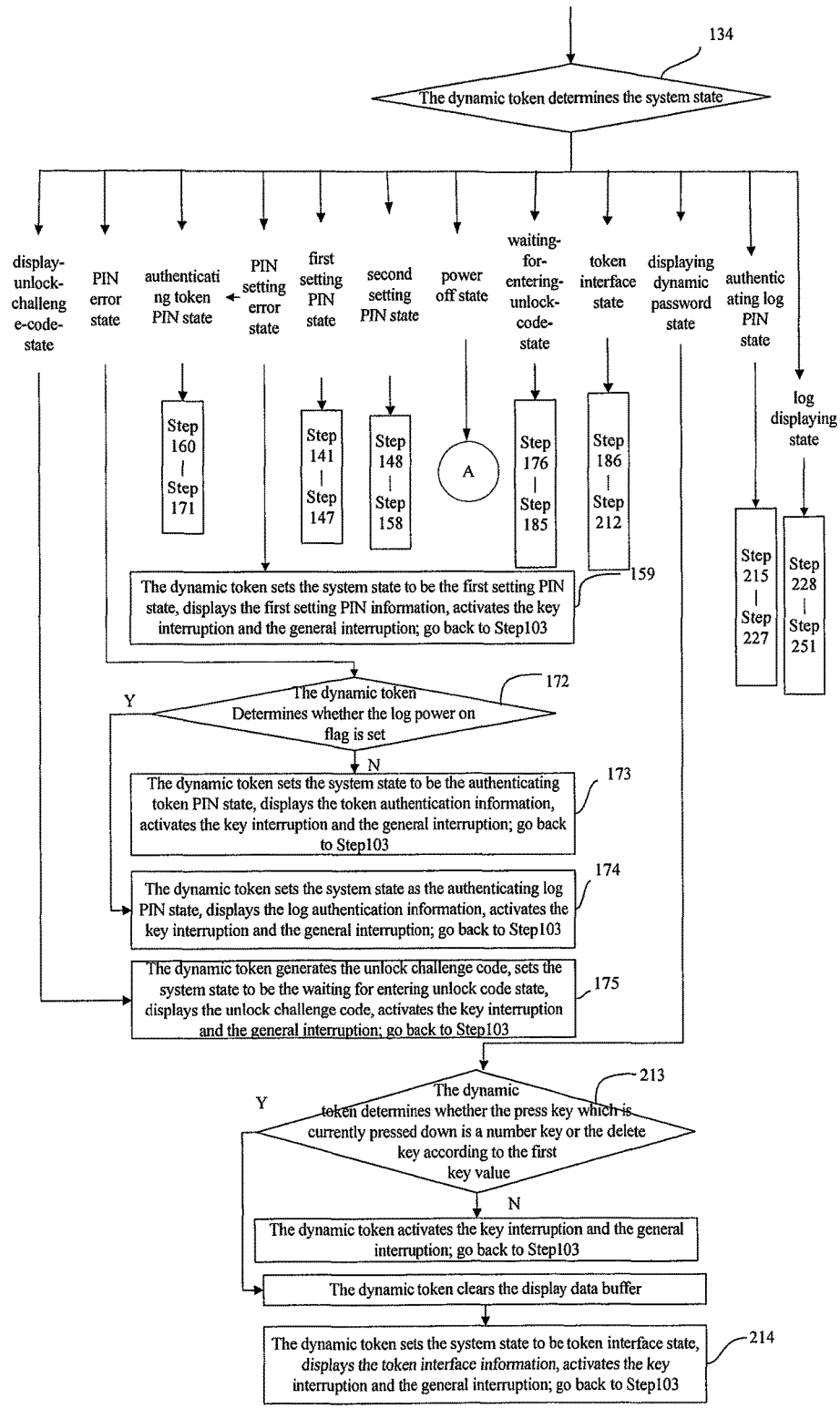
Figures 2, 4:
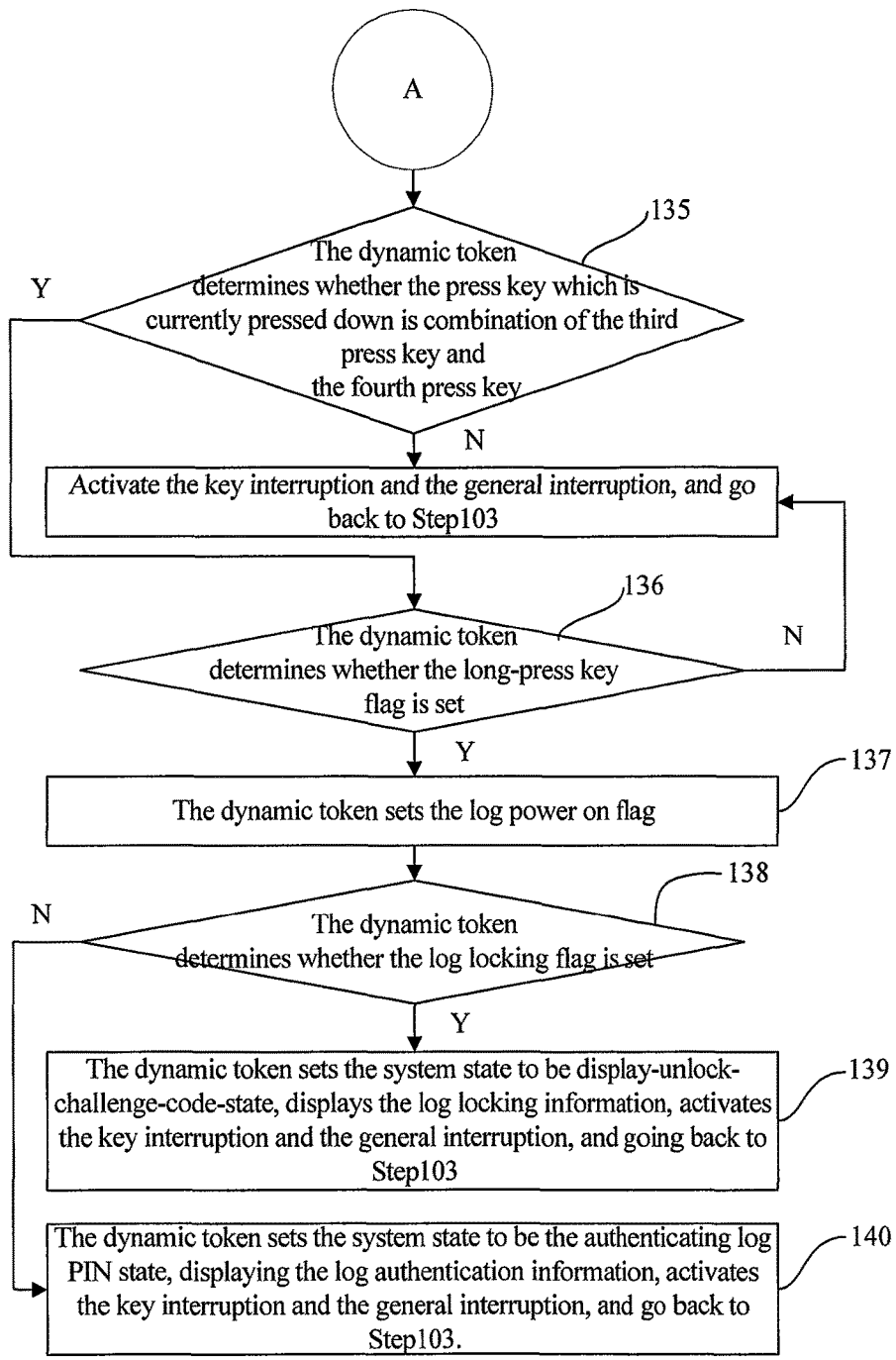
Figure 5:
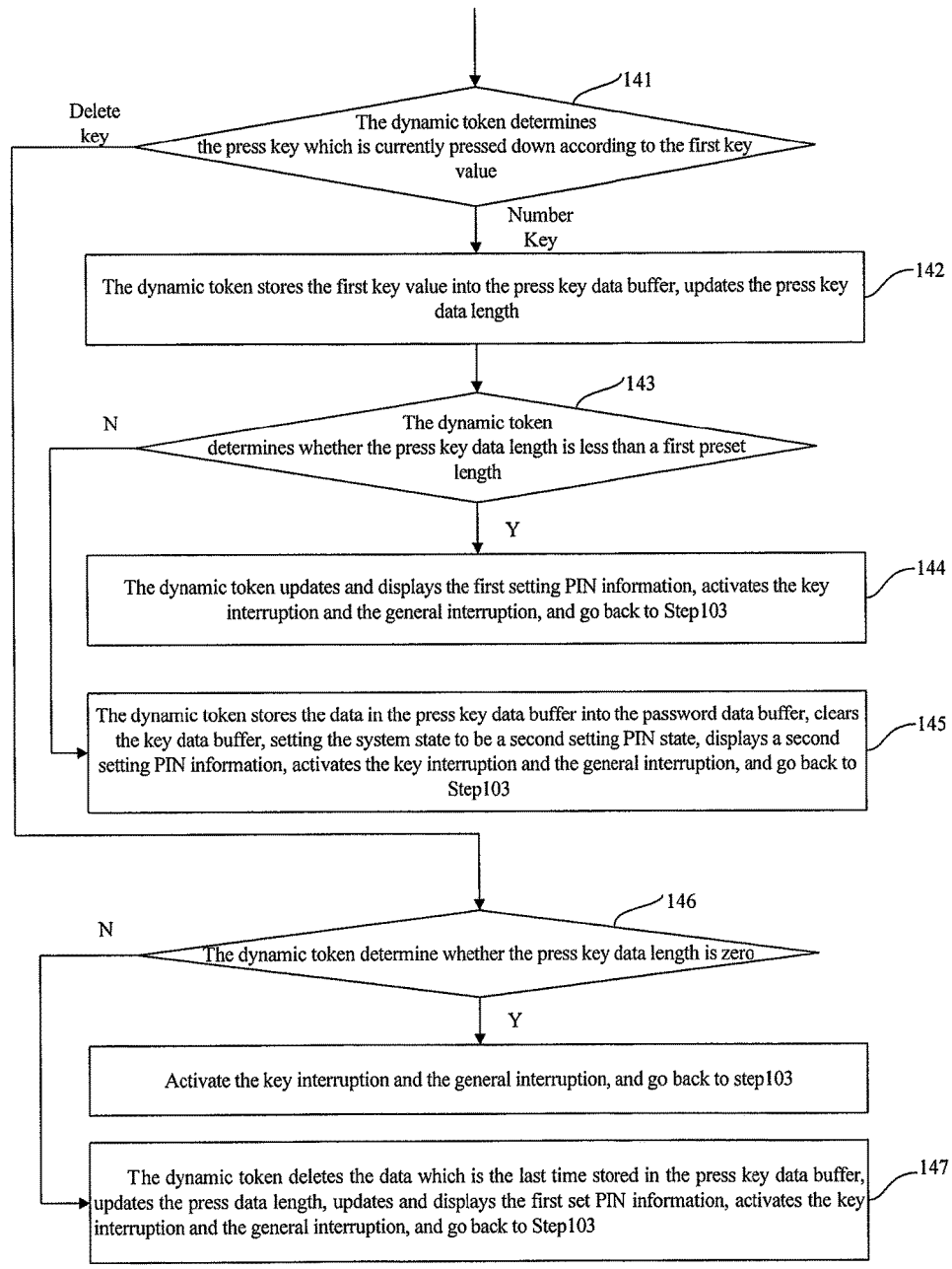
Figure 6:
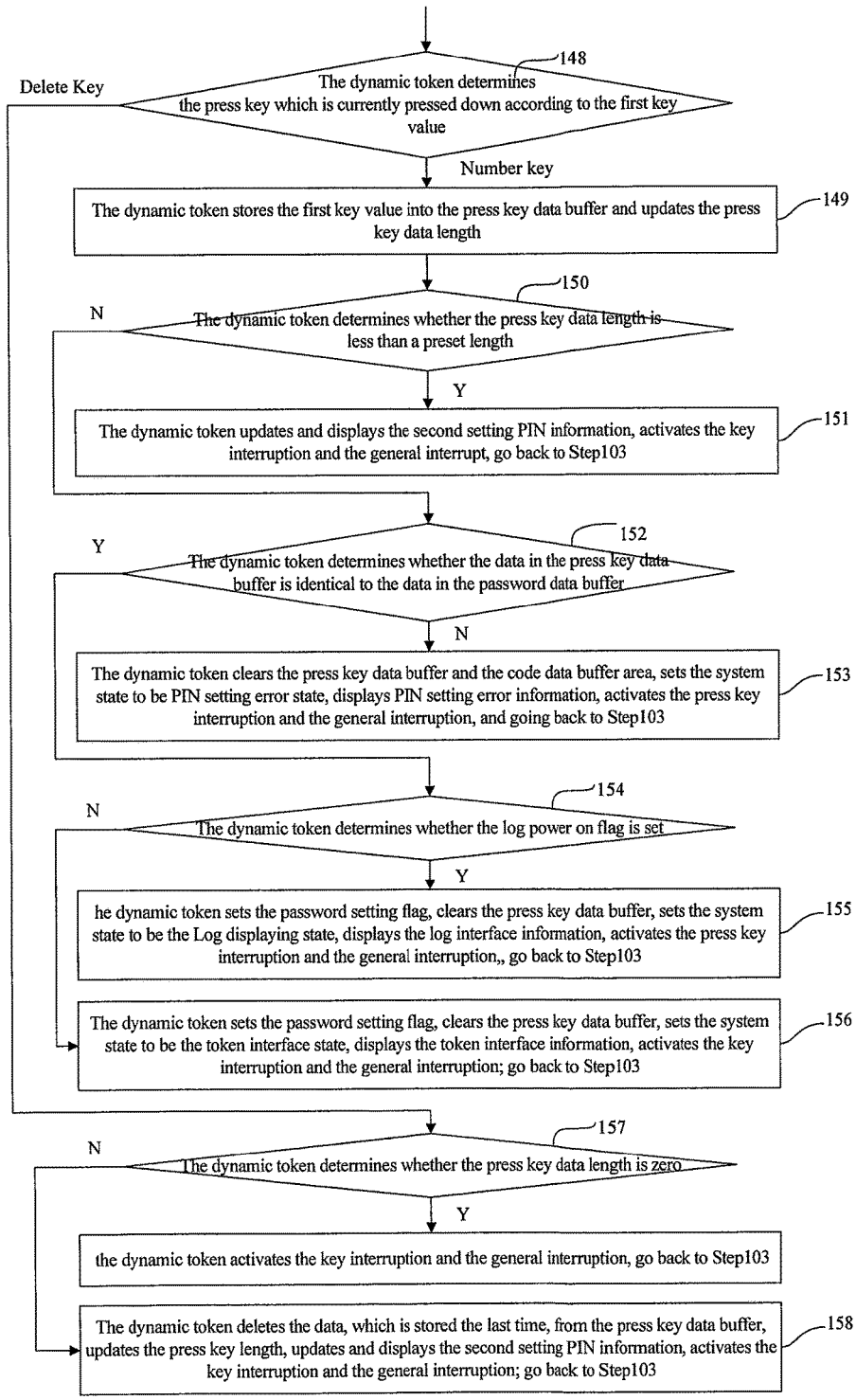
Figure 7:
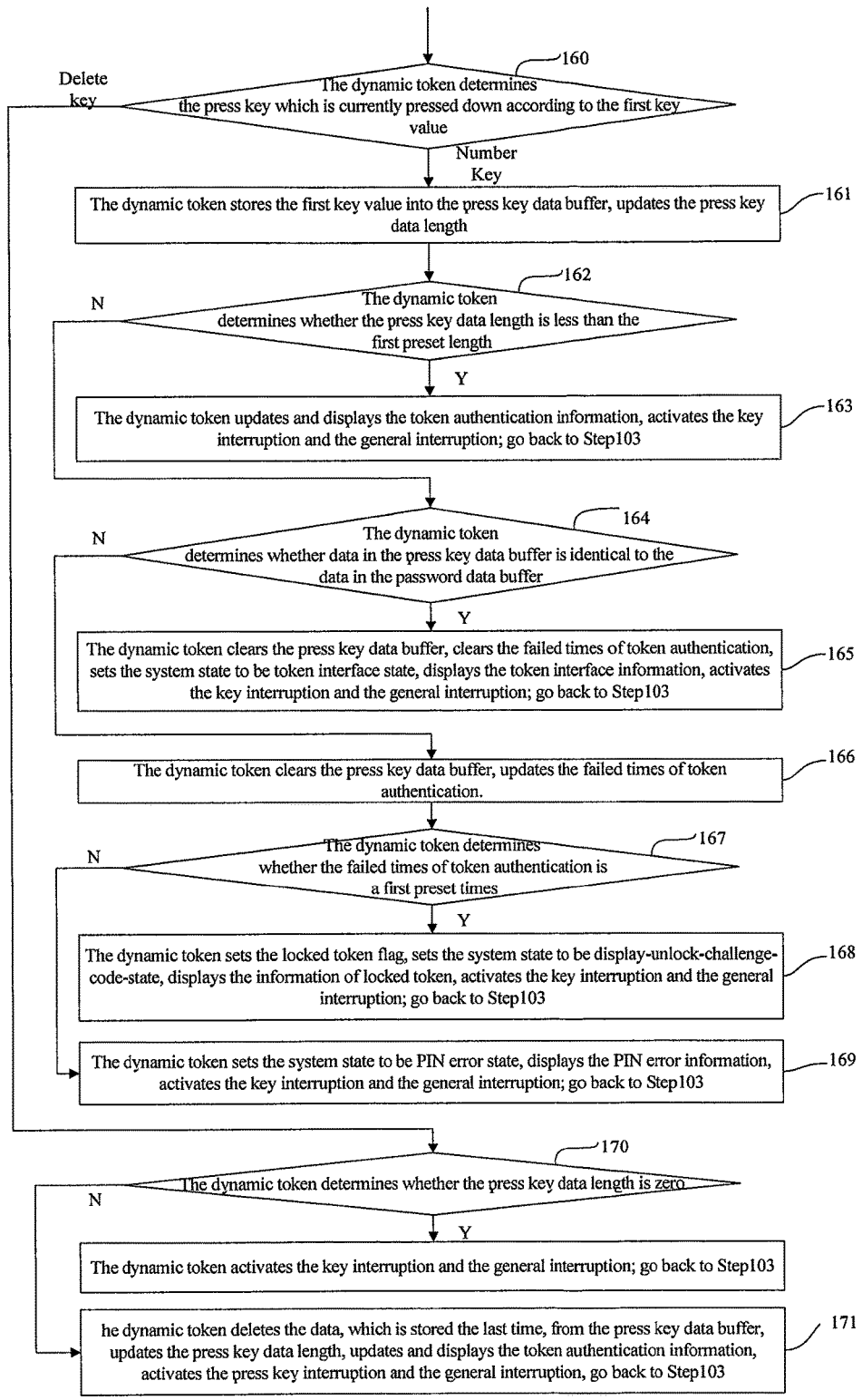
Figure 8:
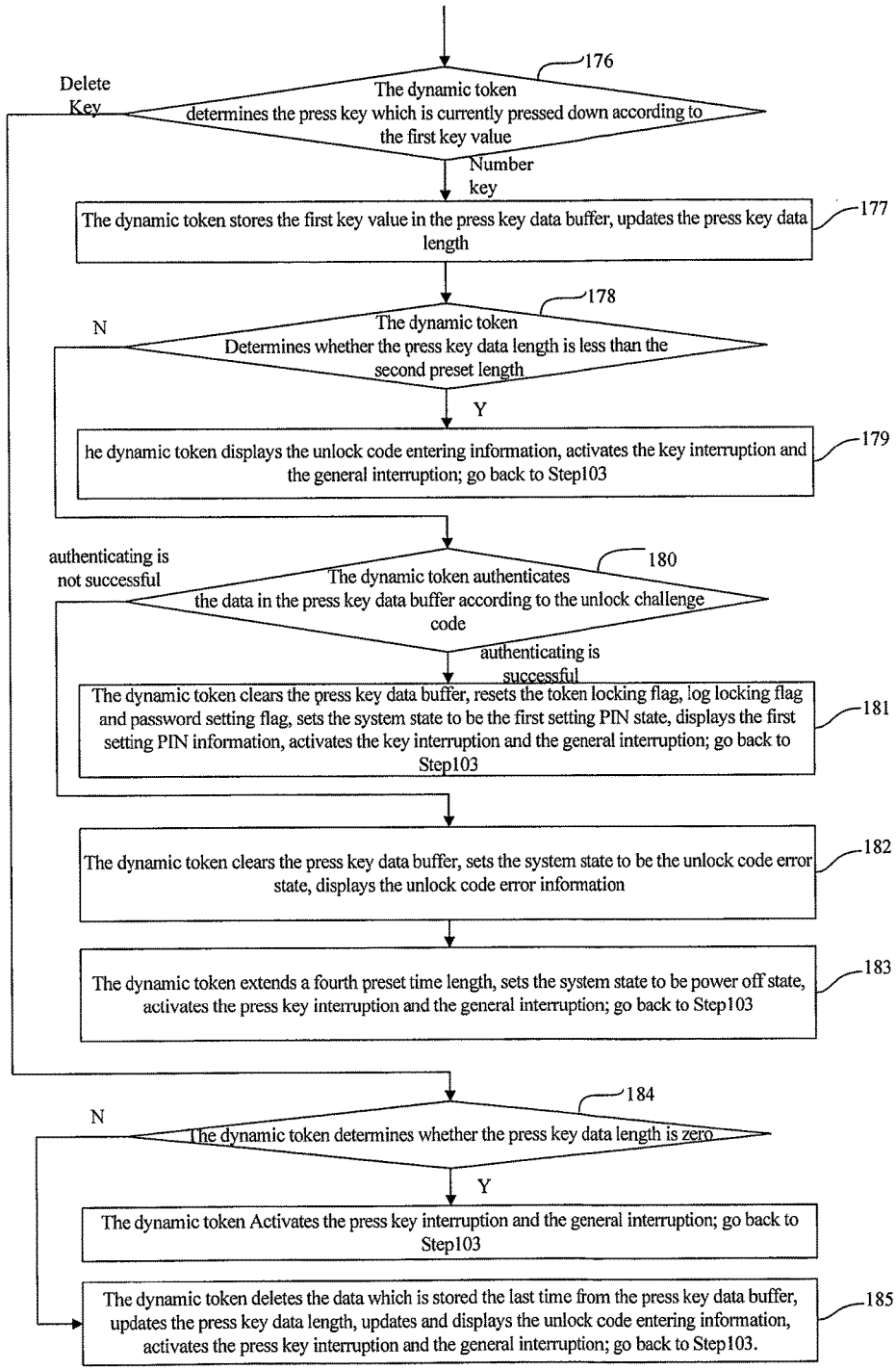
Figure 9:
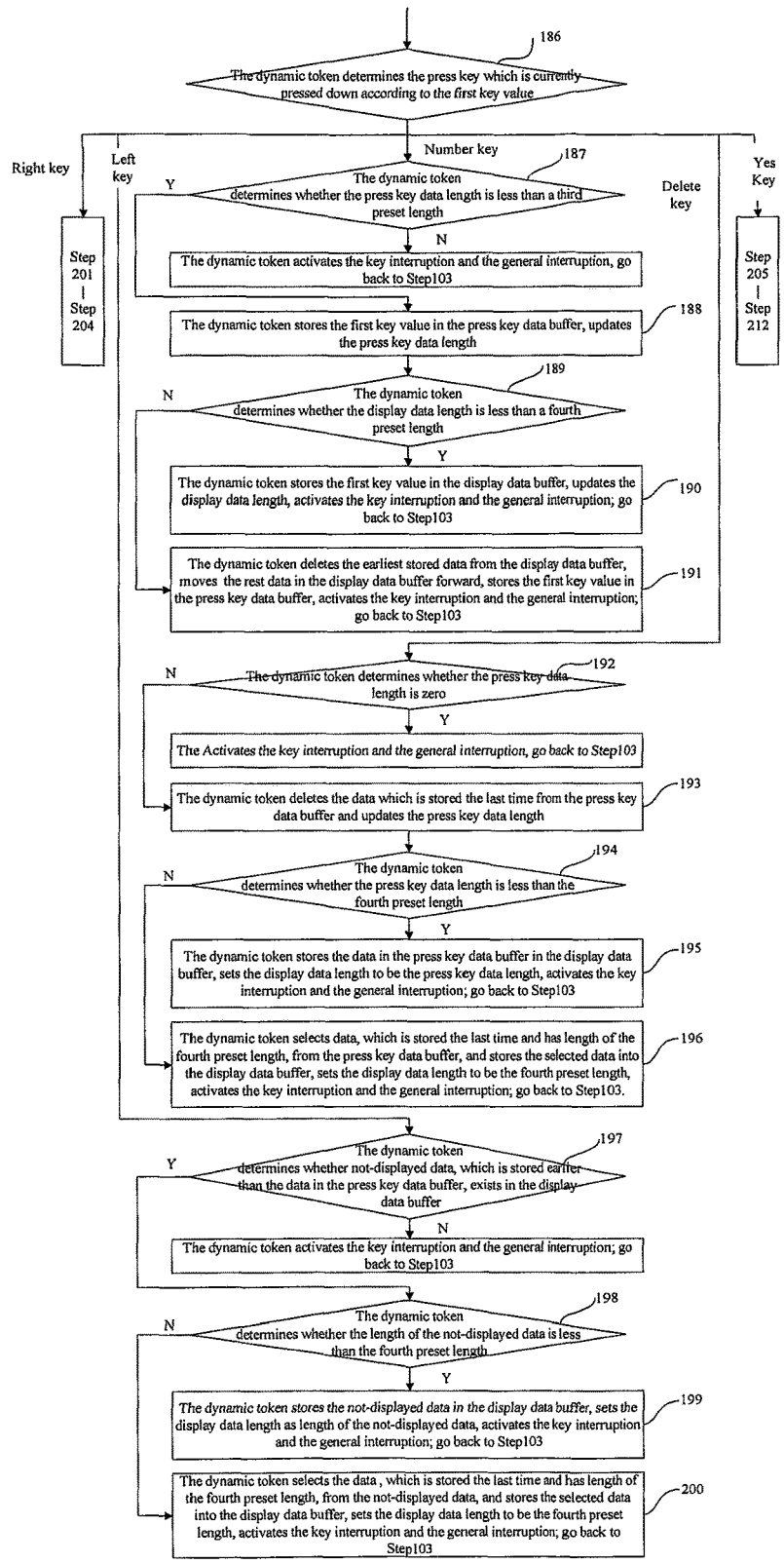
Figure 10:
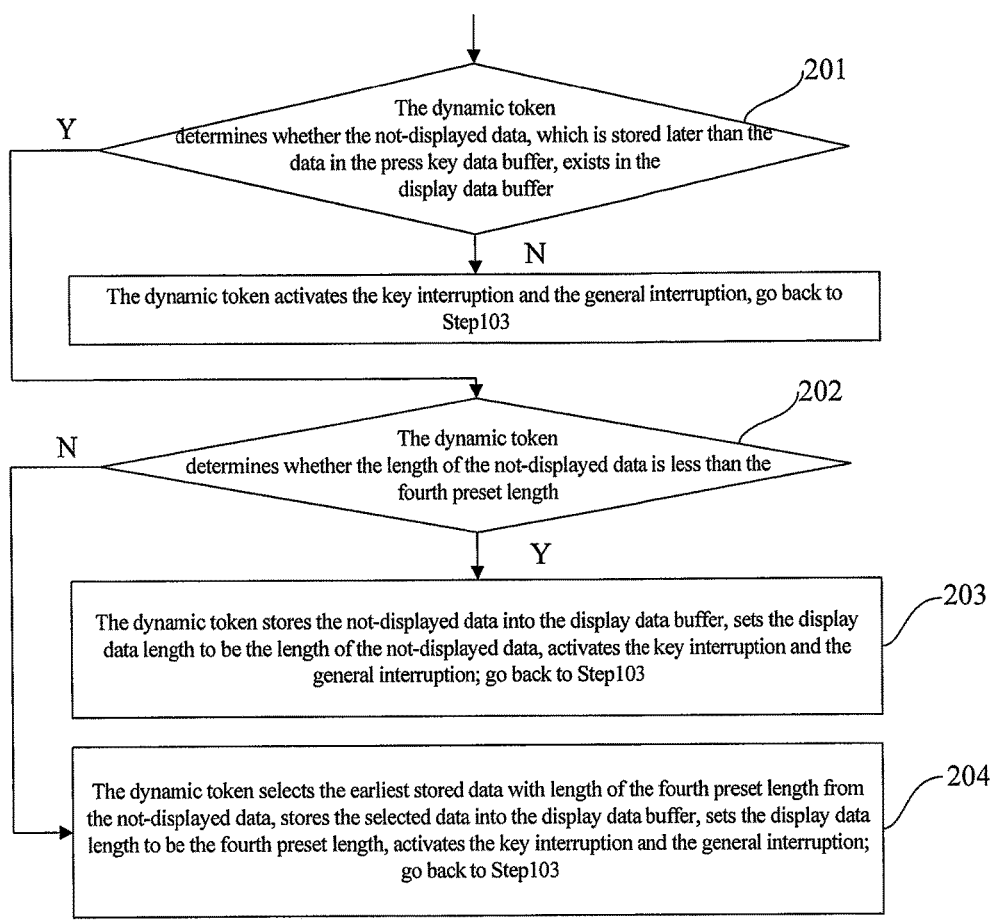
Figure 11:
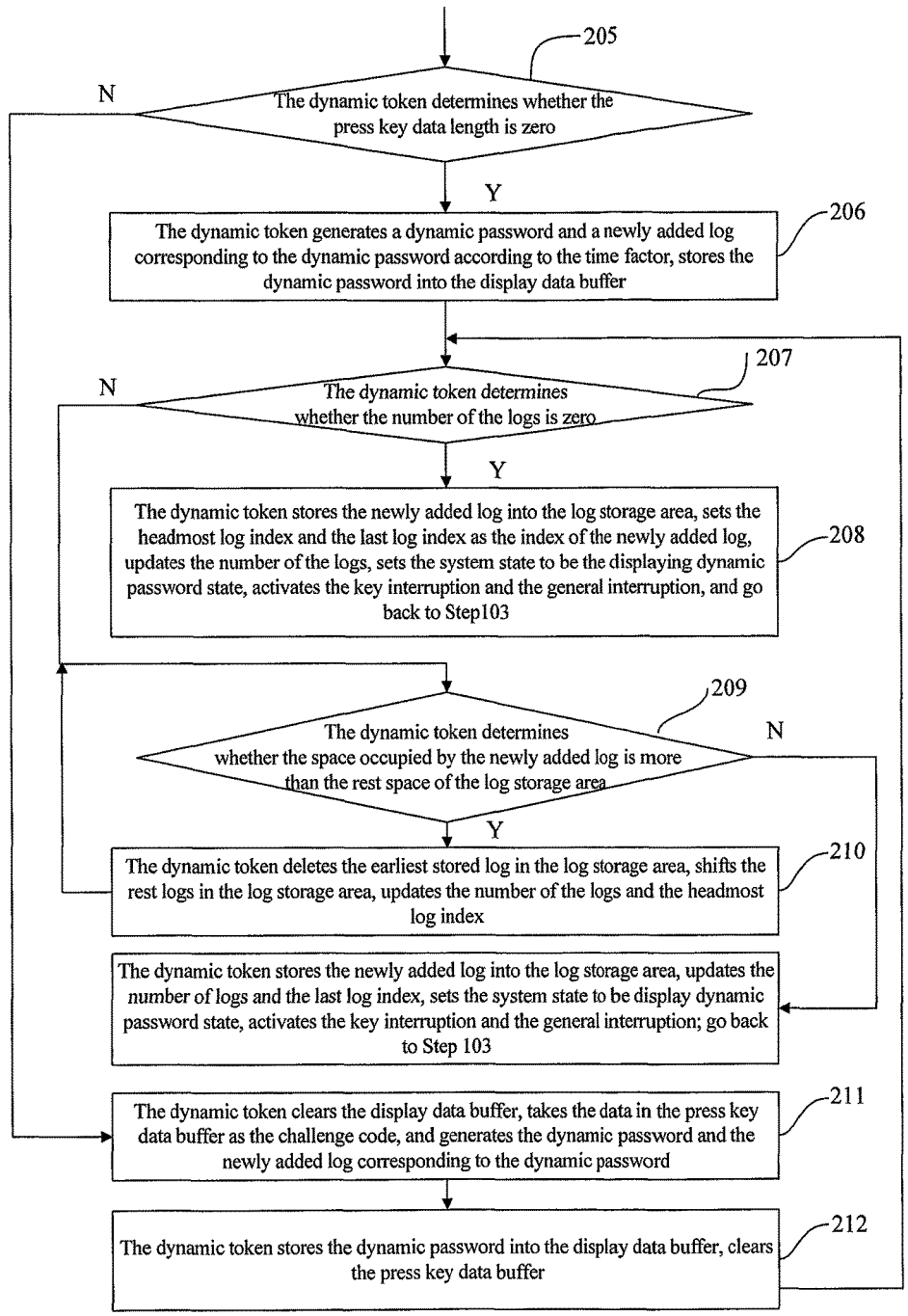
Figure 12:
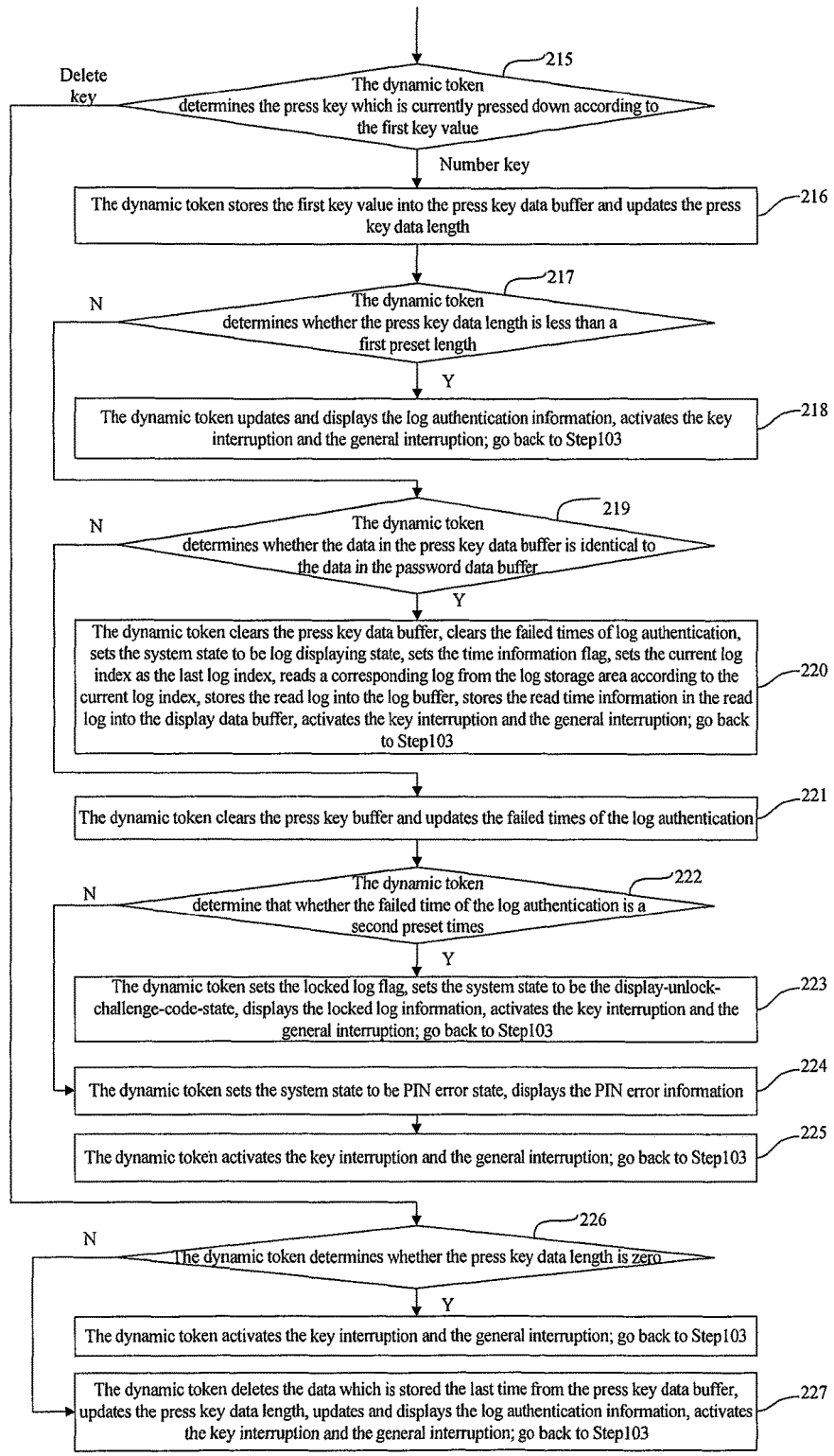
Figure 13:
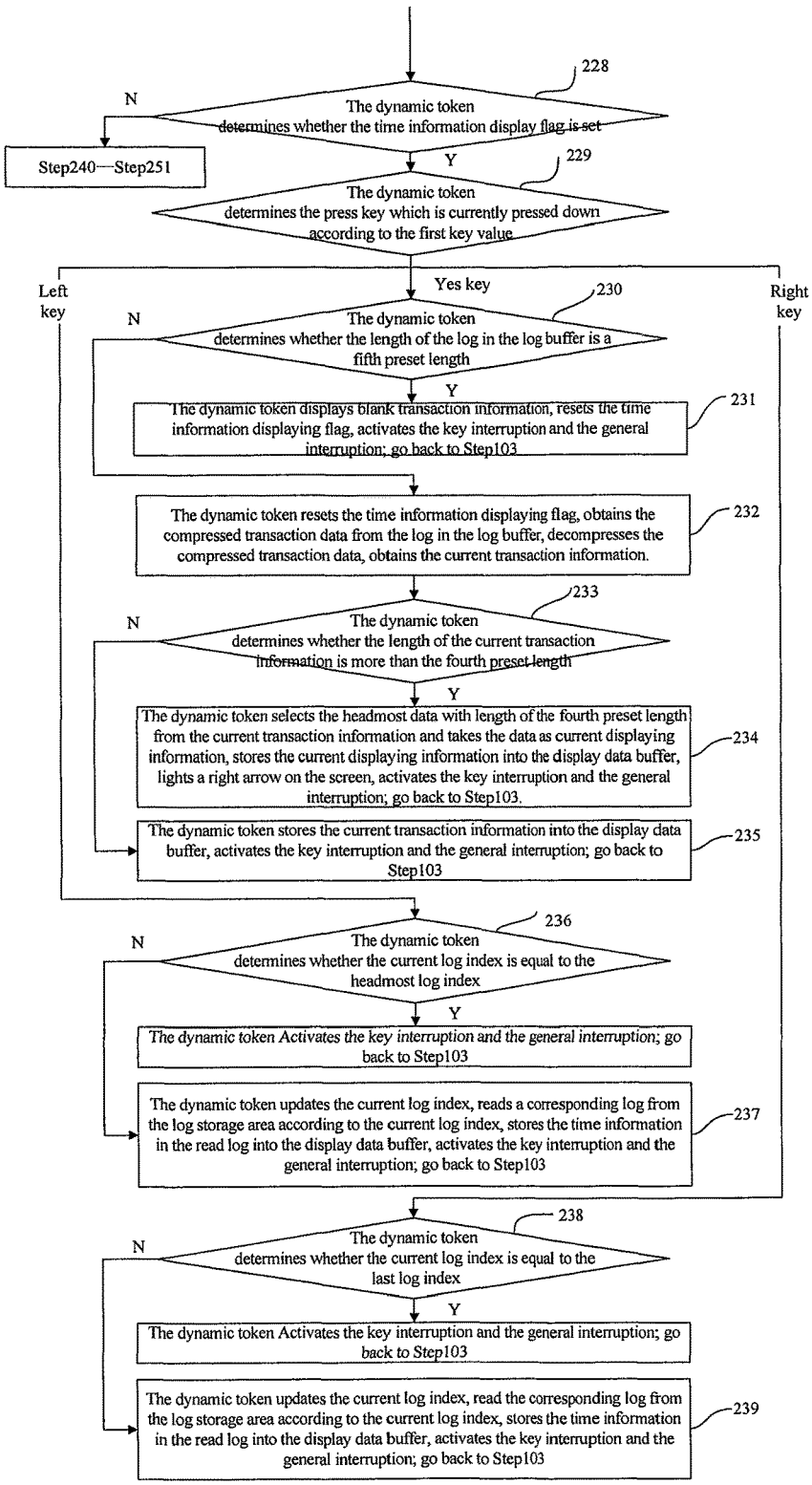
Figure 14:
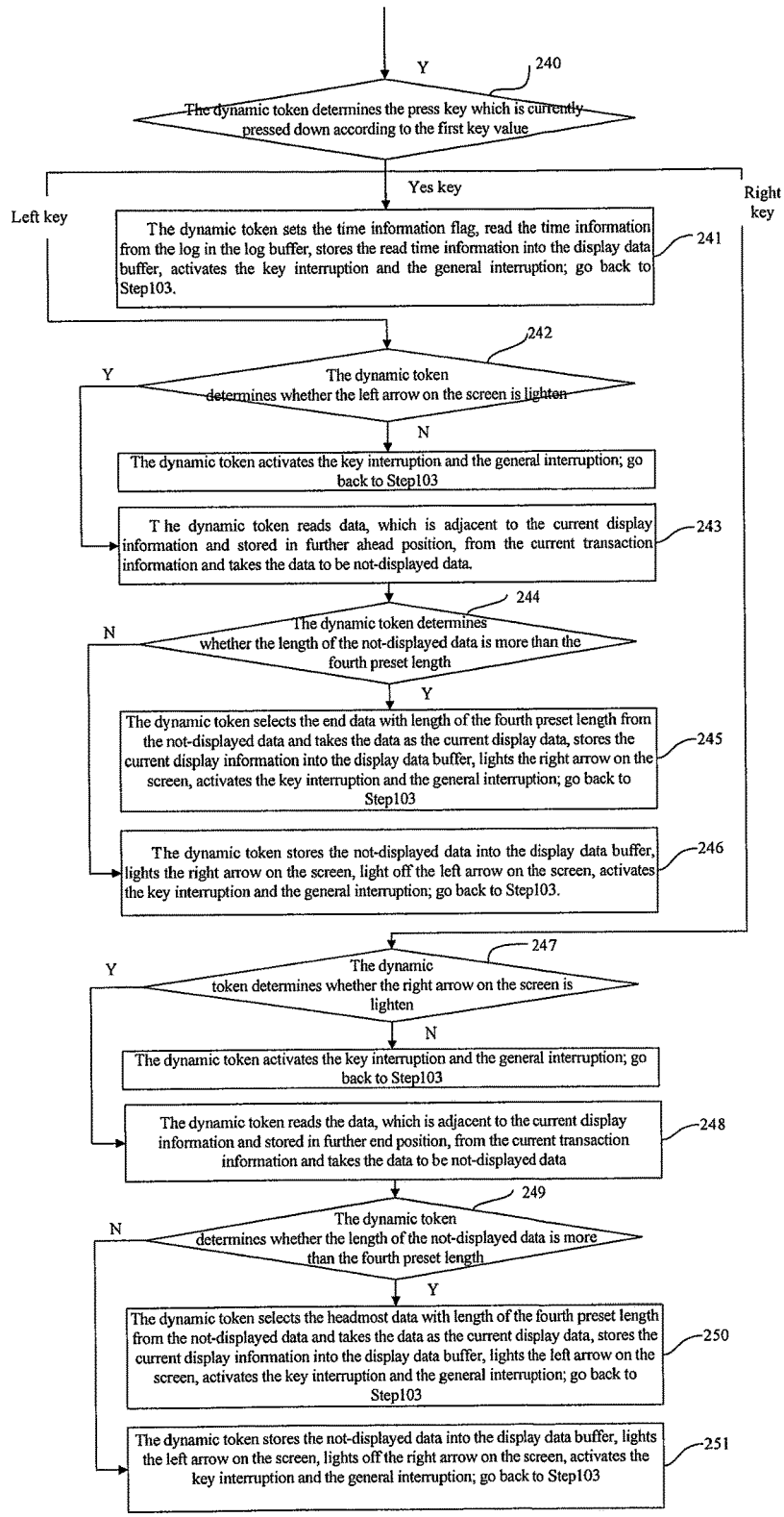

The embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of protection of the present invention.

The present invention provides a working method for a dynamic token with log function. After determining that a key interruption flag is set, the dynamic token shuts off the key interruption, scans a keyboard, obtains a first key value, determines a press key which is currently pressed down according to the first key value, if the press key which is currently pressed down is a first press key, generates a dynamic password and a log corresponding to the dynamic password, stores the password in a display data buffer, stores the log into a log storage area and activates the key interruption; if the press key which is currently pressed down is combination of a third press key and a fourth press key, reads the log from the log storage area, stores the read log into the display data buffer and activates the key interruption; in this case, the first press key is a Enter key on the dynamic token or any other press key on the dynamic token; the third press key is a number key on the dynamic token or any other press key on the dynamic token; the fourth press key is a delete key on the dynamic token or any other press key on the dynamic token.

As shown in FIG. 1 to FIG. 14, the working method for the dynamic token with log function of the present invention comprises following steps:

Step 101, the dynamic token is powered up and executes initializing operation,

Step 102, the dynamic token initializes function of general interruption and key waking up function;

Step 103, the dynamic token determines whether a set interruption flag exists, if yes, execute Step 104; otherwise, execute Step 252

Step 104, the dynamic token determines the set interruption flag, if the set interruption flag is timer interruption flag, execute Step 105; if the set interruption flag is key interruption flag, execute Step 106; if the set interruption flag is any other interruption flag, reset the set interruption flag, execute corresponding operation and go back to Step 103.

It should be noted that when a timer of the dynamic token overflows, the dynamic token receives the timer interruption, set the timer interruption flag via hardware; when the press key on the dynamic token is triggered, the dynamic token receives the key interruption and set the key interruption flag via hardware; when the dynamic token receives any other interruption, the dynamic token sets the corresponding interruption flag via hardware.

Step 105, the dynamic token resets the timer interruption flag, go back to Step 103.

Step 106, the dynamic token shuts down the key interruption, resets a long-press key flag and extends a first preset time length.

In this case, the first preset time length can be 20 ms.

Step 107, the dynamic token scans the keyboard and obtains the first key value.

Step 108, the dynamic token determines whether the first key value is empty or error key value, if yes, activate the key interruption and go back to Step 103; otherwise, execute Step 109.

Step 109, the dynamic token extends a second preset time length, stores the first key value, scans the keyboard and obtains the second key value.

In this case, the second preset time length is 20 ms.

Step 110, the dynamic token determines whether the second key value is identical to the first key value, if yes, execute Step 111; otherwise, activate the key interruption and go back to Step 103.

Step 111, the dynamic token determines whether the press key which is currently pressed down is power key according to the first key value, if yes, execute Step 113; otherwise, execute Step 112;

Step 112, the dynamic token determines whether the press key which is currently pressed down is combination of the third press key and the fourth press key according to the first key value, if yes, execute Step 113; otherwise, execute Step 125.

In this case, the third press key can be a number key, for example, 1; the fourth press key can be delete key.

Step 113, the dynamic token sets the overflow time of the timer to be a third preset time length, sets overflow times to be a first preset value.

In this case, the third preset time length can be 100 ms.

Step 114, the dynamic token activates functions of activating general interruption and timer, switches a clock source to low speed clock and enters into sleep mode.

Step 115, after being waken up, the dynamic token shuts down time counting function of the timer and switches the clock source to high speed clock.

Step 116, the dynamic token determines whether the timer interruption flag is set, if yes, execute Step 117; otherwise, go back to Step 114.

Step 117, the dynamic token determines shutting down the general interruption and resets the timer interruption flag.

Step 118, the dynamic token scans the keyboard and obtains the third key value.

Step 119, the dynamic token determines whether the third key value is empty press key, if yes, execute Step 125; otherwise, execute Step 120.

Step 120, the dynamic token determines whether the third key value is error press key, if yes, activate the key interruption and the general interruption, and go back to Step 103; otherwise, execute Step 121.

Step 121, the dynamic token determines whether the third key value is identical to the first key value, if yes, execute Step 122; otherwise, activate the key interruption and the general interruption, and go back to Step 103.

Step 122, the dynamic token updates the overflow times.

Step 123, the dynamic token determines whether the overflow times is the second preset value, if yes, execute Step 124; otherwise, go back to Step 114.

Step 124, the dynamic token sets the long-press key flag.

Step 125, the dynamic token determines whether the press key which is currently pressed down is power key according to the first key value, if yes, execute Step 126; otherwise, execute Step 134.

Step 126, the dynamic token determines whether system state is power off state, if yes, execute Step 128; otherwise, execute Step 127.

Step 127, the dynamic token clears the press key data buffer and the display data buffer, sets the system sate to be power off state, resets a log power on flag, activates the key interruption and the general interruption, go back to Step 103.

Step 128, the dynamic token determines whether the long-press key flag is set, if yes, execute Step 129; otherwise, activates the key interruption and the general interruption, go back to Step 103.

It should be noted that in Step 124, when the dynamic token determines that the overflow times is the second preset value, the dynamic token sets the long-press key flag.

Step 129, the dynamic token determines whether a locked token flag is set, if yes, execute Step 130; otherwise, execute Step 131.

It should be noted that, in Step 168, the dynamic token sets the locked token flag when the dynamic token determines that failed times of token authentication is a first preset times.

Step 130, the dynamic token sets the system state to be display-unlock-challenge-code-state, displays information of locked token, activates the key interruption and the general interruption, going back to Step 103.

Step 131, the dynamic token determines whether a password setting flag is set, if yes, execute Step 132; otherwise, execute Step 133.

It should be noted that, in Step 155, the dynamic token sets the password setting flag when the dynamic token sets the a password successfully.

Step 132, the dynamic token sets the system state to be authenticating token PIN state, displays token authentication information, activates the key interruption and the general interruption, go back to Step 103.

Step 133, the dynamic token sets the system state to be a first setting PIN state, displays a first setting PIN information, activates the key interruption and the general interruption, go back to Step 103.

Step 134, the dynamic token determines the system state, if the system state is power off state, execute Step 135; if the system state is a first setting PIN state, execute Step 141; if the system state is a second setting PIN state, execute Step 148; if the system state is PIN setting error state, execute Step 159; if the system state is authenticating token PIN state, execute Step 160; if the system state is PIN error state, execute Step 172; if the system state is display-unlock-challenge-code-state, execute Step 175; if the system state is waiting-for-entering-unlock-code-state (a state for waiting an unlock code to be entered), execute Step 176; if the system state is token interface state, execute Step 186; if the system state is displaying dynamic password state, execute Step 213; if the system state is authenticating log PIN state, execute Step 215; if the system state is log displaying state, execute Step 228.

Step 135, the dynamic token determines whether the press key which is currently pressed down is combination of the third press key and the fourth press key, if yes, execute Step 136; otherwise, activate the key interruption and the general interruption, and go back to Step 103.

Step 136, the dynamic token determines whether the long-press key flag is set, if yes, execute Step 137; otherwise, activate the long-press key and the general interruption, and go back to Step 103.

Step 137, the dynamic token sets the log power on flag.

Step 138, the dynamic token determines whether the log locking flag is set, if yes, execute Step 139; otherwise, execute Step 140.

It should be noted that, in Step 223, the dynamic token sets the log locking flag when the dynamic token determines that a failed log authentication times is a second preset times.

Step 139, the dynamic token sets the system state to be display-unlock-challenge-code-state, displays the log locking information, activates the key interruption and the general interruption, and going back to Step 103.

Step 140, the dynamic token sets the system state to be the authenticating log PIN state, displaying the log authentication information, activates the key interruption and the general interruption, and go back to Step 103.

Step 141, the dynamic token determines the press key which is currently pressed down according to the first key value, if the press key is a number key, execute Step 142; if the press key is delete key, execute Step 146.

Step 142, the dynamic token stores the first key value into the press key data buffer, updates the press key data length.

Specifically, the dynamic token take a sum of adding 1 to the press key data length as the updated press key data length.

Step 143, the dynamic token determines whether the press key data length is less than a first preset length, if yes, execute Step 144; otherwise, execute Step 145.

In this case, the first preset length is length of PIN.

In Step 144, the dynamic token updates and displays the first setting PIN information, activates the key interruption and the general interruption, and go back to Step 103.

Step 145, the dynamic token stores the data in the press key data buffer into the password data buffer, clears the key data buffer, setting the system state to be a second setting PIN state, displays a second setting PIN information, activates the key interruption and the general interruption, and go back to Step 103.

Step 146, the dynamic token determine whether the press key data length is zero, if yes, activate the key interruption and the general interruption, and go back to Step 103; otherwise, execute Step 147.

Step 147, the dynamic token deletes the data which is the last time stored in the press key data buffer, updates the press key data length, updates and displays the first set PIN information, activates the key interruption and the general interruption, and go back to Step 103.

Specifically, the dynamic token obtains a result of deducting 1 from the press key length data and take the result as the updated press key data length.

Step 148, the dynamic token determines the press key which is currently pressed down according to the first key value, if the press key is a number key, execute Step 149; if the press key is the delete key, execute Step 157.

Step 149, the dynamic token stores the first key value into the press key data buffer and updates the press key data length.

Specifically, the dynamic token obtains a sum of adding 1 to the press key data length and takes the sum as the updated press key data length.

Step 150, the dynamic token determines whether the press key data length is less than a preset length, if yes, execute Step 151; otherwise, execute Step 152.

Step 151, the dynamic token updates and displays the second setting PIN information, activates the key interruption and the general interrupt, going back to Step 103.

Step 152, the dynamic token determines whether the data in the press key data buffer is identical to the data in the password data buffer, if yes, execute Step 154; otherwise, execute Step 153.

Step 153, the dynamic token clears the press key data buffer and the code data buffer area, sets the system state to be PIN setting error state, displays PIN setting error information, activates the press key interruption and the general interruption, and going back to Step 103.

Step 154, the dynamic token determines whether the log power on flag is set, if yes, execute Step 155; otherwise, execute Step 156.

It should be noted that, in Step 137, the dynamic token sets the log power on flag when the dynamic token determines that the press key which is currently pressed down is combination of the third press key and the fourth press key and the long-press key flag is set.

Step 155, the dynamic token sets the password setting flag, clears the press key data buffer, sets the system state to be the log displaying state, displays the log interface information, activates the press key interruption and the general interruption, go back to Step 103.

Step 156, the dynamic token sets the password setting flag, clears the press key data buffer, sets the system state to be the token interface state, displays the token interface information, activates the key interruption and the general interruption; go back to Step 103.

Step 157, the dynamic token determines whether the press key data length is zero, if yes, the dynamic token activates the key interruption and the general interruption, go back to Step 103; otherwise, execute Step 158.

Step 158, the dynamic token deletes the data, which is stored the last time, from the press key data buffer, updates the press key length, updates and displays the second setting PIN information, activates the key interruption and the general interruption; go back to Step 103.

Specifically, the dynamic token obtains a result of deducting 1 from the press key data length, takes the result as the updated press key data length.

Step 159, the dynamic token sets the system state to be the first setting PIN state, displays the first setting PIN information, activates the key interruption and the general interruption; go back to Step 103.

Step 160, the dynamic token determines the press key which is currently pressed down according to the first key value, if the press key is a number key, execute Step 161; if the press key is the delete key, execute Step 170.

Step 161, the dynamic token stores the first key value into the press key data buffer, updates the press key data length.

Specifically, the dynamic token obtains a result of adding 1 to the press key data, takes the result as the updated press key data length.

Step 162, the dynamic token determines whether the press key data length is less than the first preset length, if yes, execute Step 163; otherwise, execute Step 164.

Step 163, the dynamic token updates and displays the token authentication information, activates the key interruption and the general interruption; go back to Step 103.

Step 164, the dynamic token determines whether data in the press key data buffer is identical to the data in the password data buffer, if yes, execute Step 165; otherwise, execute Step 166.

Step 165, the dynamic token clears the press key data buffer, clears the failed times of token authentication, sets the system state to be token interface state, displays the token interface information, activates the key interruption and the general interruption; go back to Step 103.

Step 166, the dynamic token clears the press key data buffer, updates the failed times of token authentication.

Specifically, the dynamic token obtains a result of adding 1 to the failed times of token authentication and takes the result as the updated failed times of token authentication.

Step 167, the dynamic token determines whether the failed times of token authentication is a first preset times, if yes, execute Step 168; otherwise, execute Step 169.

Step 168, the dynamic token sets the locked token flag, sets the system state to be display-unlock-challenge-code-state, displays the information of locked token, activates the key interruption and the general interruption; go back to Step 103.

Step 169, the dynamic token sets the system state to be PIN error state, displays the PIN error information, activates the key interruption and the general interruption; go back to Step 103.

Step 170, the dynamic token determines whether the press key data length is zero, if yes, activates the key interruption and the general interruption; go back to Step 103; otherwise, execute Step 171.

Step 171, the dynamic token deletes the data, which is stored the last time, from the press key data buffer, updates the press key data length, updates and displays the token authentication information, activates the press key interruption and the general interruption, go back to Step 103.

Specifically, the dynamic token obtains a result of deducting 1 from the press key data and takes the result as the updated press key data length.

Step 172, the dynamic token determines whether the log power on flag is set, if yes, execute Step 174; otherwise, execute Step 173.

Step 173, the dynamic token sets the system state to be the authenticating token PIN state, displays the token authentication information, activates the key interruption and the general interruption; go back to Step 103.

Step 174, the dynamic token sets the system state as the authenticating log PIN state, displays the log authentication information, activates the key interruption and the general interruption; go back to Step 103.

Step 175, the dynamic token generates the unlock challenge code, sets the system state to be the waiting for entering unlock code state, displays the unlock challenge code, activates the key interruption and the general interruption; go back to Step 103.

Step 176, the dynamic token determines the press key which is currently pressed down according to the first key value, if the press key is a number key, execute Step 177; if the press key is the delete key, execute Step 184.

Step 177, the dynamic token stores the first key value in the press key data buffer, updates the press key data length.

Specifically, the dynamic token obtains a result of adding 1 to the press key data length, takes the result as the updated press key data length.

Step 178, the dynamic token determines whether the press key data length is less than the second preset length, if yes, execute Step 179; otherwise, execute Step 180.

In this case, the second preset length is the length of the unlock code.

Step 179, the dynamic token displays the unlock code entering information, activates the key interruption and the general interruption; go back to Step 103.

Step 180, the dynamic token authenticates the data in the press key data buffer according to the unlock challenge code, if the authenticating is successful, execute Step 181; otherwise, execute Step 182.

Step 181, the dynamic token clears the press key data buffer, resets the token locking flag, log locking flag and password setting flag, sets the system state to be the first setting PIN state, displays the first setting PIN information, activates the key interruption and the general interruption; go back to Step 103.

Step 182, the dynamic token clears the press key data buffer, sets the system state to be the unlock code error state, displays the unlock code error information.

Step 183, the dynamic token extends a fourth preset time length, sets the system state to be the power off state, activates the press key interruption and the general interruption; go back to Step 103.

Step 184, the dynamic token determines whether the press key data length is zero, if yes, activates the press key interruption and the general interruption; go back to Step 103; otherwise, execute Step 185.

Step 185, the dynamic token deletes the data which is stored the last time from the press key data buffer, updates the press key data length, updates and displays the unlock code entering information, activates the press key interruption and the general interruption; go back to Step 103.

Specifically, the dynamic token obtains a result of deducting 1 from the press key data and takes the result as the updated press key data length.

Step 186, the dynamic token determines the press key which is currently pressed down according to the first key value, if the press key is a number key, execute Step 187; if the press key is the delete key, execute Step 192; if the press key is left key, execute Step 197; if the press key is right key, execute Step 201; if the press key is Enter key, execute Step 205.

Step 187, the dynamic token determines whether the press key data length is less than a third preset length, if yes, execute Step 188; otherwise, activates the key interruption and the general interruption; go back to Step 103.

In this case, the third preset length is length of the challenge code.

Step 188, the dynamic token stores the first key value in the press key data buffer, updates the press key data length.

Specifically, the dynamic token obtains a result of adding 1 to the press key data length and takes the result as the updated press key data length.

Step 189, the dynamic token determines whether the display data length is less than a fourth preset length, if yes, execute Step 190; otherwise, execute Step 191.

In this case, the fourth preset length is total length of the display data buffer.

Step 190, the dynamic token stores the first key value in the display data buffer, updates the display data length, activates the key interruption and the general interruption; go back to Step 103.

Specifically, the dynamic token obtains a result of adding 1 to the display data length and take the result as the updated display data length.

Step 191, the dynamic token deletes the earliest stored data from the display data buffer, shifts the rest data in the display data buffer forward, stores the first key value in the press key data buffer, activates the key interruption and the general interruption; go back to Step 103.

Specifically, after deleting the earliest stored data from the display data buffer, the dynamic token shifts the rest data in the display data buffer forward to a consecutive storage space which takes an initial address of the display data buffer as start position and stores the first key value at the end of the consecutive storage space.

Step 192, the dynamic token determines whether the press key data length is zero, if yes, activates the key interruption and the general interruption; go to Step 103; otherwise, execute Step 193.

Step 193, the dynamic token deletes the data which is stored the last time from the press key data buffer and updates the press key data length.

Step 194, the dynamic token determines whether the press key data length is less than the fourth preset length, if yes, execute Step 195; otherwise, execute Step 196.

Step 195, the dynamic token stores the data in the press key data buffer in the display data buffer, sets the display data length to be the press key data length, activates the key interruption and the general interruption; go back to Step 103.

Step 196, the dynamic token selects data, which is stored the last time and has length of the fourth preset length, from the press key data buffer, and stores the selected data into the display data buffer, sets the display data length to be the fourth preset length, activates the key interruption and the general interruption; go back to Step 103.

Step 197, the dynamic token determines whether not-displayed data, which is stored earlier than the data in the press key data buffer, exists in the display data buffer, if yes, execute Step 198; otherwise, activates the key interruption and the general interruption; go back to Step 103.

Step 198, the dynamic token determines whether the length of the not-displayed data is less than the fourth preset length, if yes, execute Step 199; otherwise, execute Step 200.

Step 199, the dynamic token stores the not-displayed data in the display data buffer, sets the display data length as length of the not-displayed data, activates the key interruption and the general interruption; go back to Step 103.

Step 200, the dynamic token selects the data, which is stored the last time and has length of the fourth preset length, from the not-displayed data, and stores the selected data into the display data buffer, sets the display data length to be the fourth preset length, activates the key interruption and the general interruption; go back to Step 103.

Step 201, the dynamic token determines whether the not-displayed data, which is stored later than the data in the press key data buffer, exists in the display data buffer, if yes, execute Step 202; otherwise, activates the key interruption and the general interruption; go back to Step 103.

Step 202, the dynamic token determines whether the length of the not-displayed data is less than the fourth preset length, if yes, execute Step 203; otherwise, execute Step 204.

Step 203, the dynamic token stores the not-displayed data into the display data buffer, sets the display data length to be the length of the not-displayed data, activates the key interruption and the general interruption; go back to Step 103.

Step 204, the dynamic token selects the earliest stored data with length of the fourth preset length from the not-displayed data, stores the selected data into the display data buffer, sets the display data length to be the fourth preset length, activates the key interruption and the general interruption; go back to Step 103.

Step 205, the dynamic token determines whether the press key data length is zero, if yes, execute Step 206; otherwise, execute Step 211.

Step 206, the dynamic token generates a dynamic password and a newly added log corresponding to the dynamic password according to the time factor, stores the dynamic password into the display data buffer.

Specifically, the dynamic token generates a time type dynamic password according to the time factor, allocates an index to the newly added log and takes the length of the time information corresponding to the time factor as the length of the newly added log, combines the index, the length of the newly added log, and the time information corresponding to the time factor to obtain the newly added log.

Step 207, the dynamic token determines whether the number of the logs is zero, if yes, execute Step 208; otherwise, execute Step 209.

Step 208, the dynamic token stores the newly added log into the log storage area, sets the headmost log index and the last log index as the index of the newly added log, updates the number of the logs, sets the system state to be the displaying dynamic password state, activates the key interruption and the general interruption; go back to Step 103.

Specifically, the dynamic token obtains a result of adding 1 to the number of logs and takes the result as the updated number of logs.

Step 209, the dynamic token determines whether the space occupied by the newly added log is more than the rest space of the log storage area, if yes, execute Step 210; otherwise, stores the newly added log into the log storage area, updates the number of logs and the last log index, sets the system state to be display dynamic password state, activates the key interruption and the general interruption; go back to Step 103.

Specifically, the dynamic token can update the last log index to be the index of the newly added log.

Step 210, the dynamic token deletes the earliest stored log in the log storage area, shifts the rest logs in the log storage area, updates the number of the logs and the headmost log index; go back to Step 209.

Specifically, after deleting the earliest stored log from the display data buffer, the dynamic token shifts the rest logs in the log storage area forward to a consecutive storage space which takes an initial address of the log storage area as start position, deducts 1 from the number of logs, takes deducting result as the updated number of logs and adds 1 to the headmost log index.

Step 211, the dynamic token clears the display data buffer, takes the data in the press key data buffer as the challenge code, and generates the dynamic password and the newly added log corresponding to the dynamic password.

Specifically, the dynamic token generates a challenge type dynamic password according to the time factor and the challenge code, allocates an index to the newly added log, compresses transaction information corresponding to the challenge code, obtains the compressed transaction data, obtains a sum of the length of the time information corresponding to the time factor and the length of the compressed transaction data and takes the sum as the length of the newly added log, combines the index, the length of the newly added log, the time information corresponding to the time factor and the compressed transaction data to obtain the newly added log.

Step 212, the dynamic token stores the dynamic password into the display data buffer, clears the press key data buffer; go back to Step 207.

Step 213, the dynamic token determines whether the press key which is currently pressed down is a number key or the delete key according to the first key value, if yes, clears the display data buffer, execute Step 214; otherwise, activates the key interruption and the general interruption; go back to Step 103.

Step 214, the dynamic token sets the system state to be token interface state, displays the token interface information, activates the key interruption and the general interruption; go back to Step 103.

Step 215, the dynamic token determines the press key which is currently pressed down according to the first key value, if the press key is a number key, execute Step 216; if the press key is delete key, execute Step 226.

Step 216, the dynamic token stores the first key value into the press key data buffer and updates the press key data length.

Specifically, the dynamic token obtains a result of adding 1 to the press key data length and takes the result as the updated press key data length.

Step 217, the dynamic token determines whether the press key data length is less than a first preset length, if yes, execute Step 218; otherwise, execute Step 219.

Step 218, the dynamic token updates and displays the log authentication information, activates the key interruption and the general interruption; go back to Step 103.

Step 219, the dynamic token determines whether the data in the press key data buffer is identical to the data in the password data buffer, if yes, execute Step 220; otherwise, execute Step 221.

Step 220, the dynamic token clears the press key data buffer, clears the failed times of log authentication, sets the system state to be log displaying state, sets the time information flag, sets the current log index as the last log index, reads a corresponding log from the log storage area according to the current log index, stores the read log into the log buffer, stores the read time information in the read log into the display data buffer, activates the key interruption and the general interruption; then go back to Step 103.

In the present embodiment, that the dynamic token reads a corresponding log from the log storage area according to the current log index specifically includes: setting, by the dynamic token, a reading pointer to be an initial address of the log storage area, reading a corresponding log from the log storage area according to the reading pointer, determining whether the index in the read log is identical to the current log index, if yes, determining that the read log is the log corresponding to the current log index; otherwise, updating the reading pointer according to the size of the space occupied by the read log, keeping on reading the corresponding log from the log storage area according to the read pointer till to read an index in the log which is identical to that of the current log.

Step 221, the dynamic token clears the press key buffer and updates the failed times of the log authentication.

Specifically, the dynamic token obtains a result of adding 1 to the failed times of log authentication and takes result as the updated failed times of the log authentication.

Step 222, the dynamic token determines that whether the failed time of the log authentication is a second preset times, if yes, execute Step 223; otherwise, execute Step 224.

Step 223, the dynamic token sets the log locking flag, sets the system state to be the display-unlock-challenge-code-state, displays the log locking information, activates the key interruption and the general interruption; go back to Step 103.

Step 224, the dynamic token sets the system state to be PIN error state, displays the PIN error information.

Step 225, the dynamic token activates the key interruption and the general interruption; go back to Step 103.

Step 226, the dynamic token determines whether the press key data length is zero, if yes, activates the key interruption and the general interruption; go back to Step 103; otherwise, execute Step 227.

Step 227, the dynamic token deletes the data which is stored the last time from the press key data buffer, updates the press key data length, updates and displays the log authentication information, activates the key interruption and the general interruption; go back to Step 103.

Specifically, the dynamic token obtains a result of deducting 1 from the press key data length and takes the result as the updated press key data length.

Step 228, the dynamic token determines whether the time information display flag is set, if yes, execute Step 229; otherwise, execute Step 240.

It should be noted that, in Step 220, when the dynamic token determines that the data in the press key data buffer is identical to the data in the password data buffer, the dynamic token sets the time information display flag.

Step 229, the dynamic token determines the press key which is currently pressed down according to the first key value, if the press key is Enter key, execute Step 230; if the press key is the left key, execute Step 236; if the press key is the right key, execute Step 238.

Step 230, the dynamic token determines whether the length of the log in the log buffer is a fifth preset length, if yes, execute Step 231; otherwise, execute Step 232.

In this case, the fifth preset length is length of the time information in the log.

Step 231, the dynamic token displays blank transaction information, resets the time information displaying flag, activates the key interruption and the general interruption; go back to Step 103.

Step 232, the dynamic token resets the time information displaying flag, obtains the compressed transaction data from the log in the log buffer, decompresses the compressed transaction data, obtains the current transaction information.

Step 233, the dynamic token determines whether the length of the current transaction information is more than the fourth preset length, if yes, execute Step 234; otherwise, execute Step 235.

Step 234, the dynamic token selects the headmost data with length of the fourth preset length from the current transaction information and takes the data as current displaying information, stores the current displaying information into the display data buffer, lights a right arrow on the screen, activates the key interruption and the general interruption; go back to Step 103.

Step 235, the dynamic token stores the current transaction information into the display data buffer, activates the key interruption and the general interruption; go back to Step 103.

Step 236, the dynamic token determines whether the current log index is equal to the headmost log index, if yes, activates the key interruption and the general interruption; go back to Step 103; otherwise, execute Step 237.

Step 237, the dynamic token updates the current log index, reads a corresponding log from the log storage area according to the current log index, stores the time information in the read log into the display data buffer, activates the key interruption and the general interruption; go back to Step 103.

Specifically, the dynamic token can deduct 1 from the current log index.

Step 238, the dynamic token determines whether the current log index is equal to the last log index, if yes, activates the key interruption and the general interruption; go back to Step 103; otherwise, execute Step 239.

Step 239, the dynamic token updates the current log index, read the corresponding log from the log storage area according to the current log index, stores the time information in the read log into the display data buffer, activates the key interruption and the general interruption; then go back to Step 103.

Specifically, the dynamic token can add 1 to the current log index. Step 240, the dynamic token determines the press key which is currently pressed down according to the first key value, if the press key is Enter key, execute Step 241;

if the press key is the left key, execute Step 242;

if the press key is the right key, execute Step 247.

Step 241, the dynamic token sets the time information flag, read the time information from the log in the log buffer, stores the read time information into the display data buffer, activates the key interruption and the general interruption; go back to Step 103.

Step 242, the dynamic token determines whether the left arrow on the screen is lighten, if yes, execute Step 243; otherwise, activates the key interruption and the general interruption; go back to Step 103.

Step 243, the dynamic token reads data, which is adjacent to the current display information and stored in further ahead position, from the current transaction information and takes the data to be not-displayed data.

Step 244, the dynamic token determines whether the length of the not-displayed data is more than the fourth preset length, if yes, execute Step 245; otherwise, execute Step 246.

Step 245, the dynamic token selects the end data with length of the fourth preset length from the not-displayed data and takes the data as the current display data, stores the current display information into the display data buffer, lights the right arrow on the screen, activates the key interruption and the general interruption; go back to Step 103.

Step 246, the dynamic token stores the not-displayed data into the display data buffer, lights the right arrow on the screen, light off the left arrow on the screen, activates the key interruption and the general interruption; go back to Step 103.

Step 247, the dynamic token determines whether the right arrow on the screen is lighten, if yes, execute Step 248; otherwise, activates the key interruption and the general interruption; go back to Step 103.

Step 248, the dynamic token reads the data, which is adjacent to the current display information and stored in further end position, from the current transaction information and takes the data to be not-displayed data.

Step 249, the dynamic token determines whether the length of the not-displayed data is more than the fourth preset length, if yes, execute Step 250; otherwise, execute Step 251.

Step 250, the dynamic token selects the headmost data with length of the fourth preset length from the not-displayed data and takes the data as the current display data, stores the current display information into the display data buffer, lights the left arrow on the screen, activates the key interruption and the general interruption; go back to Step 103.

Step 251, the dynamic token stores the not-displayed data into the display data buffer, lights the left arrow on the screen, lights off the right arrow on the screen, activates the key interruption and the general interruption; go back to Step 103.

Step 252, the dynamic token activates the general interruption, switches the clock source to low speed clock and enters sleep mode.

Step 253, the dynamic token is waken up, switches the clock source to high speed clock; go back to Step 103.

In the embodiments of the present invention, after generating the dynamic password, the dynamic token generates and records a log corresponding to the dynamic password for the user to check so as to record information related to the completed identity authentication. In this way, the user can recheck whether the completed identity authentication is completed by the dynamic token itself, therefore the security of the identity authentication mechanism using the dynamic password and the dynamic token is improved.

It should be noted that, in other embodiments of the present invention, the dynamic token determines the press key which is currently pressed down according to the first key value; if the press key which is currently pressed down is a first press key, the dynamic token generates a dynamic password and a log corresponding to the dynamic password, stores the dynamic password into the display data buffer, stores the log into the log storage area, activates the key interruption; if the press key which is currently pressed down is a second press key, the dynamic token reads a log from the log storage area, stores the read log into the display data buffer, activates the key interruption, which can achieve purpose as same as the present invention.

In addition, in the other embodiments of the present invention, the dynamic token can activate the press key interruption after determining that the press key which is currently pressed down is the second press key or a combination of the third press key or the fourth press key according to the first key value, shut off the key interruption and scan the keyboard after determining that the set interruption flag is the key interruption flag, read the log from the log storage area and stores the read log into the display data buffer and activate the key interruption after determining that the pressed key which is currently pressed down is the fifth press key, which can achieve purpose as same as the present invention.

Figure 15:
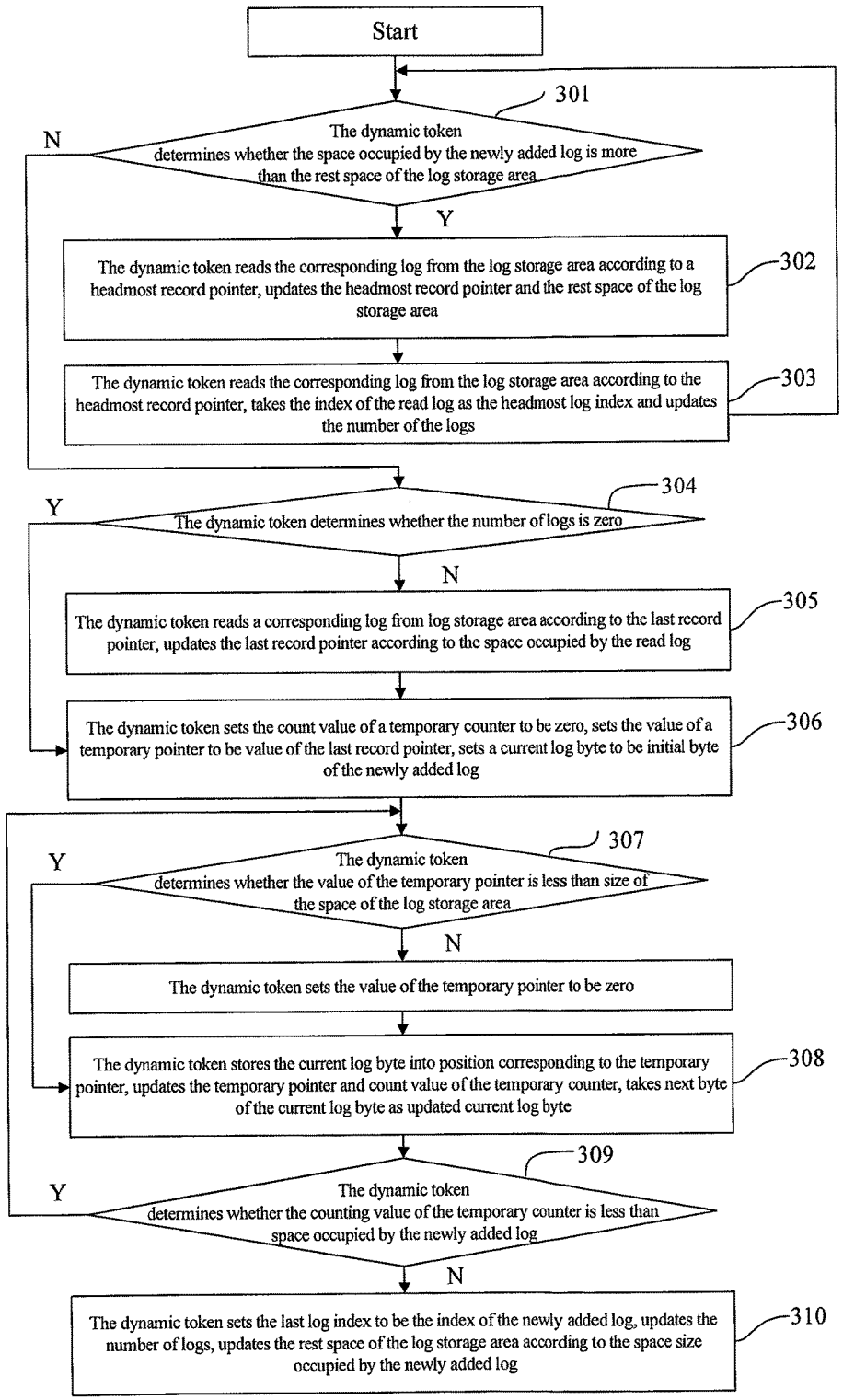
FIG. 15 is a flow diagram of a method for storing a newly added log by the dynamic token in the embodiments of the present invention.

In addition, in the other embodiments of the present invention, the dynamic token can store the newly added log in way of circular queue in the log storage area, as shown in FIG. 15, which includes the following steps:

Step 301, the dynamic token determines whether the space occupied by the newly added log is more than the rest space of the log storage area, if yes, execute Step 302; otherwise, execute Step 304.

Step 302, the dynamic token reads the corresponding log from the log storage area according to a headmost record pointer, updates the headmost record pointer and the rest space of the log storage area.

Specifically, the dynamic token adds the head most record pointer and the rest space of the log storage area respectively to the size of the space of the read log occupied by the read log, and takes the results to be the updated headmost record pointer and the rest room of the log storage area respectively.

Step 303, the dynamic token reads the corresponding log from the log storage area according to the headmost record pointer, takes the index of the read log as the headmost log index and updates the number of the logs; go back to Step 301.

Specifically, the dynamic token can deduct 1 from the number of logs.

Step 304, the dynamic token determines whether the number of logs is zero, if yes, execute Step 306; otherwise, execute Step 305.

Step 305, the dynamic token reads a corresponding log from the log storage area according to the last record pointer, updates the last record pointer according to the space occupied by the read log, execute Step 306.

Specifically, the dynamic token adds the last record pointer and the space occupied by the read log to obtain a result and takes the obtained result as the updated last record pointer.

Step 306, the dynamic token sets the count value of a temporary counter to be zero, sets the value of a temporary pointer to be value of the last record pointer, sets a current log byte to be initial byte of the newly added log.

Step 307, the dynamic token determines whether the value of the temporary pointer is less than size of the space of the log storage area, if yes, execute Step 308; otherwise, set the value of the temporary pointer to be zero, execute Step 308.

Step 308, the dynamic token stores the current log byte into position corresponding to the temporary pointer, updates the temporary pointer and count value of the temporary counter, takes next byte of the current log byte as updated current log byte.

Specifically, the dynamic token adds 1 to the temporary pointer, adds 1 to a counting value of the temporary counter.

Step 309, the dynamic token determines whether the counting value of the temporary counter is less than space occupied by the newly added log, if yes, execute Step 307; otherwise, execute Step 310.

Step 310, the dynamic token sets the last log index to be the index of the newly added log, updates the number of logs, updates the rest space of the log storage area according to the space size occupied by the newly added log.

Specifically, the dynamic token can add 1 to the number of logs, deducts size of the space occupied by the newly added log from the rest space in the log storage area, takes a result of deducting as the updated rest space in the log storage area.

Figure 16:
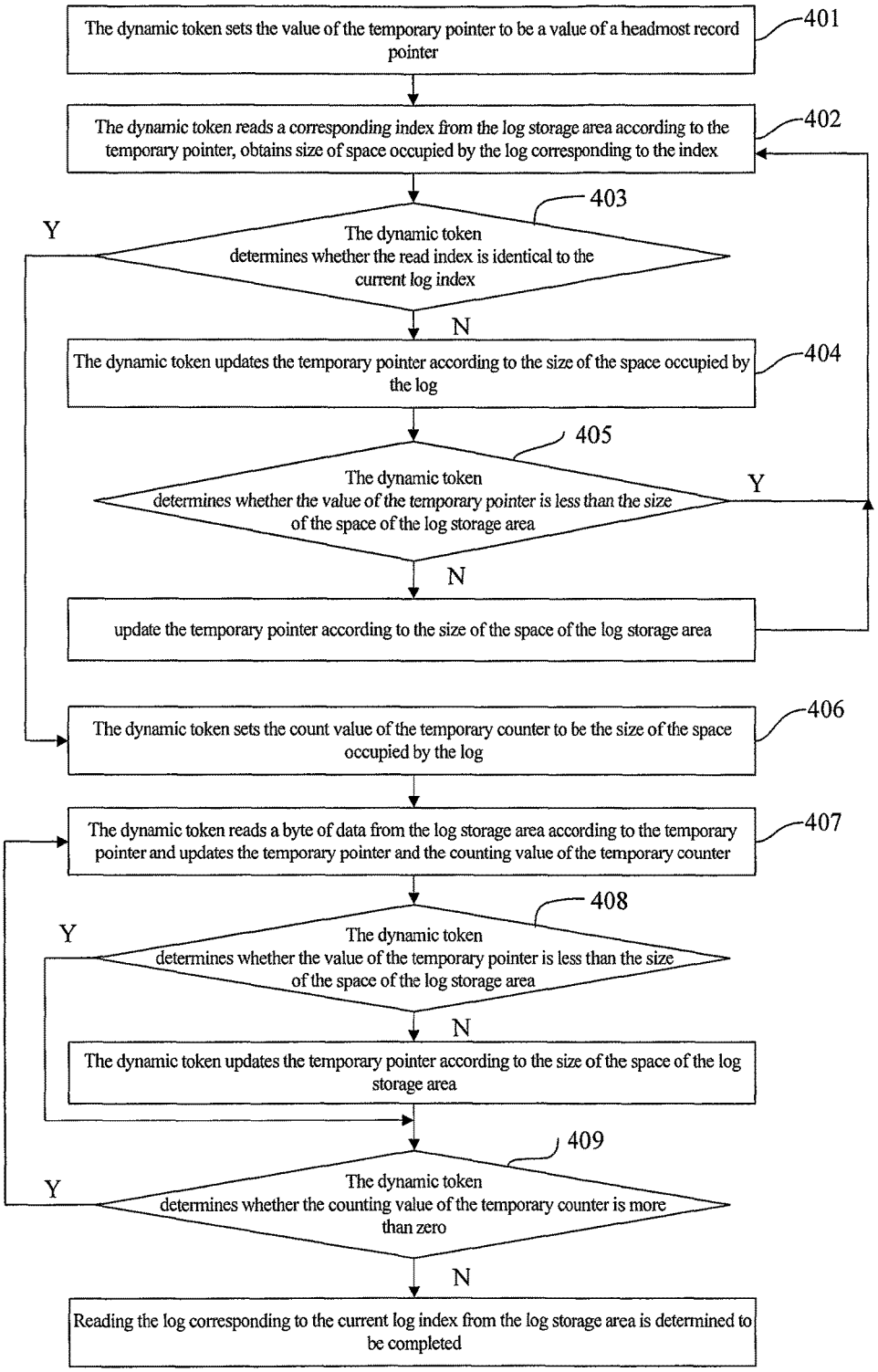
FIG. 16 is a flow diagram of a method for reading a log by the dynamic token in the embodiments of the present invention.

Based on way of log storage above, a flow that the dynamic token reads a corresponding log from the log storage area according to the current log index, as shown in FIG. 16, comprises the following steps:

Step 401, the dynamic token sets the value of the temporary pointer to be a value of a headmost record pointer;

Step 402, the dynamic token reads a corresponding index from the log storage area according to the temporary pointer, obtains size of space occupied by the log corresponding to the index.

Step 403, the dynamic token determines whether the read index is identical to the current log index, if yes, execute Step 406; otherwise, execute Step 404.

Step 404, the dynamic token updates the temporary pointer according to the size of the space occupied by the log;

Specifically, the dynamic token can add the temporary pointer and the size of the space occupied by the log to obtain a result and takes the result as the updated temporary pointer.

Step 405, the dynamic token determines whether the value of the temporary pointer is less than the size of the space of the log storage area, if yes, go back to Step 402; otherwise, updates the temporary pointer according to the size of the space of the log storage area; go back to Step 402.

Specifically, the dynamic token can deduct the size of the space of the log storage area from the temporary pointer to obtain a result and takes the result as the updated temporary pointer.

Step 406, the dynamic token sets the count value of the temporary counter to be the size of the space occupied by the log.

Step 407, the dynamic token reads a byte of data from the log storage area according to the temporary pointer and updates the temporary pointer and the counting value of the temporary counter.

Specifically, the dynamic token can add 1 to the temporary pointer and deduct 1 from the temporary counter.

Step 408, the dynamic token determines whether the value of the temporary pointer is less than the size of the space of the log storage area, if yes, execute Step 409; otherwise, updates the temporary pointer according to the size of the space of the log storage area; execute Step 409.

Specifically, the dynamic token can deduct the size of the space of the log storage area from the temporary pointer to obtain a result and takes the result as the updated temporary pointer.

Step 409, the dynamic token determines whether the counting value of the temporary counter is more than zero, if yes, go back to Step 407; otherwise, reading the log corresponding to the current log index from the log storage area is determined to be completed.

Figure 17:
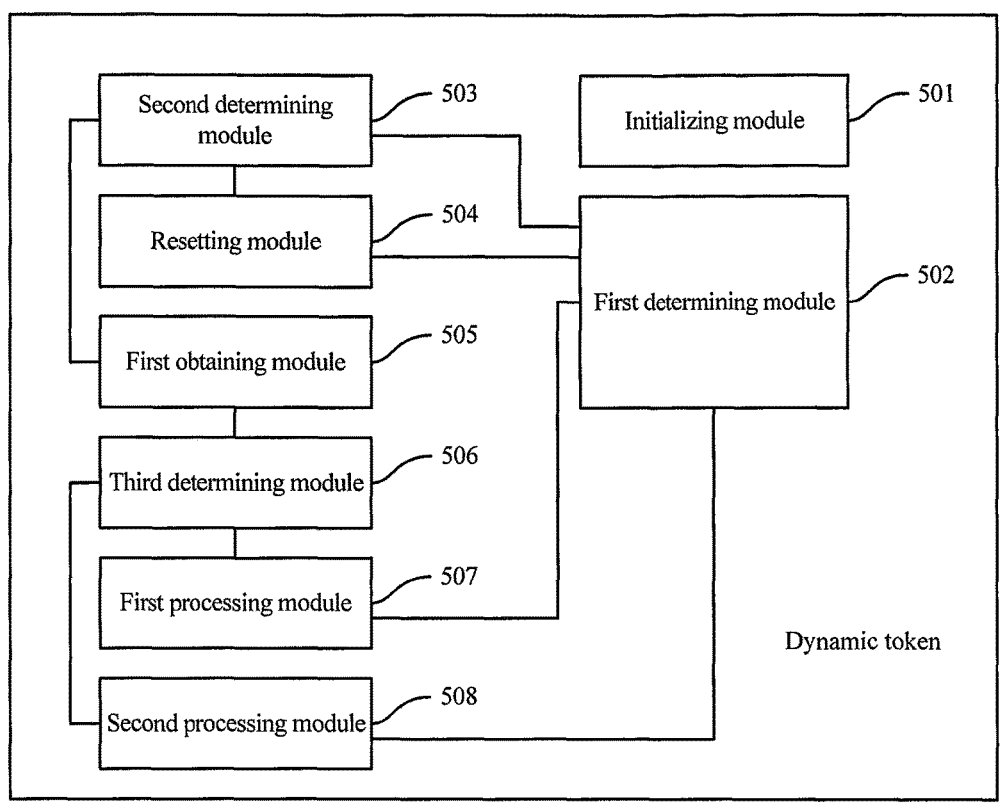
FIG. 17 is a structural diagram of a dynamic token with log function in the embodiments of the present invention.

Based on the flow of working method above, the embodiment of the present invention further provides a dynamic token with log function. As shown in FIG. 17, the dynamic token includes:

an initializing module 501 configured to, after being powered up, execute initializing operation, activate general interruption and press key waking function;

a first determining module 502 configured to determine whether a set interruption flag exists;

a second determining module 503 configured to, after the first determining module 502 determines that the set interruption flag exists, determine the set interruption flag;

a resetting module 504 configured to, after the second determining module 503 determines that the set interruption flag is timer interruption flag, resetting the timer interruption flag and trigger the first determining module 502 to determine whether the set interruption flag exists;

a first obtaining module 505 configured to, after the second determining module 503 determines that the set interruption flag is key interruption flag, shut down the key interruption, scan a keyboard and obtain a first key value;

a third determining module 506 configured to determine a press key which is currently pressed down according to the first key value obtained by the first obtaining module 505;

a first processing module 507 configured to, after the third determining module 506 determines that the press key which is currently pressed down is a first press key, generate a dynamic password and a log corresponding to the dynamic password, store the dynamic password in a display data buffer, store the log in a log storage area, initialize the key interruption and trigger the first determining module 502 to determine whether the set interruption flag exists; and a second processing module 508 configure to, when the third determining module 506 determines that the press key which is currently pressed down is a second press key or combination of a third press key and a fourth press key, read a log from the log storage area, store the read log in the display data buffer, activate the key interruption and trigger the first determining module 502 to determine whether a set interruption flag exists.

Specifically, the second processing module 508 configured to, after the third determining module 506 determines that the press key which is currently pressed down is the second press key or combination of the third press key and the fourth press key, execute following operation:

T1, activate the key interruption, determine whether the set interruption flag exists, if yes, execute Step T2; otherwise, keep on execute Step T1;

T2, after determining that the set key interruption flag is press key interruption flag, shut down the key interruption, scan the keyboard; and T3, after determining that the press key which is currently pressed down is a fifth press key according the key value obtained by scanning, read the log from the log storage area, store the read log in the display data buffer, activate the key interruption and trigger the first determining module 502 to determine whether the set interruption flag exists.

In this case, the first press key can be Enter key, correspondingly, the dynamic token further includes:

a third processing module configured to, when the third determining module 506 determines that the press key which is currently pressed down is a number key, determine whether the press key data length is less than a third preset length; if yes, store the first key value into a press key data buffer and a display data buffer, update the press key data length, activate the key interruption and trigger the first determine module 502 to determine whether the set interrupt flag exists; otherwise, activate the key interruption and trigger the first determining module 502 to determine whether the set interrupt flag exists; when the third determining module 506 determines that the press key which is currently pressed down is delete key, determine whether the press key data length is zero, if yes, activate the press key interruption and trigger the first determine module 502 to determine whether the set interrupt flag exists; otherwise, delete the last time stored data from the press key data buffer, update the press key data length, delete the last time stored data from the display data buffer, activate the key interruption and trigger the first determining module 502 to determine whether the set interruption flag exists;

the first processing module 507 includes:

a first determining sub-module configured to, when the third determining module 506 determines that the press key which is currently pressed down is Enter key, determine whether the press key data length is zero;

a first generating sub-module configured to, when the first determining module determines that the press key data length is zero, generate a dynamic password and a newly added log corresponding to the dynamic password;

specifically, the first generating sub-module configured to, when the first determining sub-module determines that the press key data length is zero, allocate an index to the newly added log according to a time type dynamic password generated according to time factor, take length of time information corresponding to the time factor as length of the newly added log; combine the index, the length of the newly added log and the time information corresponding to the time factor so as to obtain the newly added log;

a second generating sub-module configured to, when the first determining module determines that the press key data length is not zero, take the data in the press key data buffer as challenge code, generate the dynamic password and the newly added log corresponding to the dynamic password;

specifically, the second generating sub-module above configured to, when the first determining sub-module determines that the press key data length is not zero, generate a challenge type dynamic password according to the time factor and the challenge code, allocate an index to the newly added log, compress transaction information corresponding to the challenge code to obtain compressed transaction data, obtain a sum of length of time information corresponding to the time factor and the length of the compressed transaction data and take the sum as the length of the newly added log, combine the index, the length of the newly added log, time information corresponding to time factor and the compressed transaction data to obtain the newly added log;

a first storing sub-module, configured to store the dynamic passwords generated by the first generating sub-module and the second generating sub-module into the display data buffer;

a second storing sub-module configured to store the newly added log generated by the first generating sub-module and the second generating sub-module into the log storage area;

an activating sub-module configured to, after the first generating sub-module or the second generating sub-module generate the dynamic passwords and the newly added log, activate the press key interruption, and trigger the first determining module 502 determines whether a set interrupt log exists;

specially, the second storing sub-module configured to determine whether number of logs is zero, if yes, store the newly added log into the log storage area, set the headmost log index and the last log index to be the index of the newly added log, update the number of logs; otherwise, store the newly added log into the log storage area, set the last log index to be the index of the newly added log, update the number of the logs.

Further, the second processing module 508 specifically configured to set the current log index as the last log index, read a corresponding log from the log storage area according to the current log index, store the read log into the log buffer, store the time information of the read log into the display data buffer, activate the key interrupt and trigger the first determining module 502 to determine whether the set interruption flag exists.

Correspondingly, the dynamic token above further includes:

a fourth processing module configured to, when the second processing module 508 triggers the first determining module 502 to determine that the set interruption flag exists and the third determining module 506 determines that the press key which is currently pressed down is left key, determine whether the current log index equals the headmost log index, if yes, activate the key interruption and trigger the first determining module 502 to determine whether the set interruption flag exists; otherwise, update the current log index, read corresponding log from the log storage area according to the current log index, stores the time information in the read log into the display data buffer, activate the press key interruption and trigger the first determining module 502 to determine whether the set interruption flag exists;

a fifth processing module configured to, when the second processing module 508 triggers the first determining module 502 to determine that the set interruption flag exists and the third determining module 506 determines that the press key which is currently pressed down is right key, determine whether the current log index equals the last log index, if yes, activate the press key interruption and trigger the first determining module 502 to determine whether the set interruption flag exists; otherwise, update the current log index, read a corresponding log from the log storage area according to the current log index, stores the read time information in the read log into the display data buffer, activate the key interruption and trigger the first determining module 502 to determine whether the set interruption flag exists.

Further, the dynamic token further includes:

a fourth determining module configured to determine whether the time information display flag is set;

correspondingly, the fourth processing module specifically configured to, when the fourth determining module determines that the time information display flag is set, the second processing module 508 triggers the first determining module 502 to determine whether the set interruption flag exists and the third determining module 506 determines that the left key which is currently pressed down is left key, determine whether the current log index equals to the headmost log index, if yes, activate the key interruption and trigger the first determining module 502 to determine whether the set interruption flag exists; otherwise, update the current log index, read a corresponding log from the log storage area according to the current log index, store the time information in the read log into the display data buffer, activate the key interruption and trigger the first determining module 502 to determine whether the set key interruption flag exists;

the fifth processing module specifically configured to, when the fourth determining module determines that the time information display flag is set, the second processing module 508 triggers the first determining module 502 to determine that the set key interruption flag exists and the third determining module 506 determines that the press key which is currently pressed down is right key, determine the current log index is the last log index, if yes, activate the key interruption and trigger the first determining module 502 to determine whether the set interruption flag exists; otherwise, update the current log index, read a corresponding log from the log storage area according to the current log index, stores the time information in the read log into the display data buffer, activate the key interruption and trigger the first determining module 502 to determine whether the set interruption flag exists.

The dynamic token further includes:

a sixth processing module specifically configured to, when the fourth determining module determines that the time information display flag is set, the second processing module 508 triggers the first determining module 502 to determine that the set interruption flag exists and the third determining module 506 determines that the press key which is currently pressed down is Enter key, execute following operation:

R1) determine whether the length of the log in the log buffer is a fifth preset length, if yes, execute Step R2; otherwise, execute Step R3;

R2) display blank transaction information, reset the time information display flag, activate the key interruption and trigger the first determining module 502 to determine whether the set interruption flag exists;

R3) reset the time information display flag, obtain transaction data from the log of the log buffer, decompress the compressed transaction data, determine whether the length of the current transaction information obtained by decompressing is more than the fourth preset length, if yes, execute Step R4; otherwise, execute Step R5;

R4) select the headmost data with length of the fourth preset length from the current transaction information and takes the data as current displaying information, store the current displaying information into the display data buffer, light a right arrow on the screen, activate the key interruption and trigger the first determining module 502 to determine whether the set interruption flag exists; and R5) store the current transaction information into the display data buffer, activate the key interruption and trigger the first determining module 502 to determine whether the set interruption flag exists.

It should be noted that, in another embodiment of the present invention, the second processing module 508 specifically is configured to, when the third determining module 506 determines that the press key which is currently pressed down is the second press key or combination of the third press key and the fourth press key, set the current log index to be the last log index, read a corresponding log from the log storage area according to the current log index, decompress the compressed transaction data in the read data, store the current transaction information obtained by decompressing into the log buffer, determine whether the current transaction information is more than the fourth preset length, if yes, select the headmost data with length of the fourth preset length from the current transaction as the current display information, store the current display information into the display data buffer, light the right arrow of the screen, activate the key interruption and trigger the first determining module 502 to determine whether the set interruption flag exists; otherwise, store the current transaction information into the display data buffer, activate the key interruption and trigger the first determining module 502 to determine whether the set interruption flag exists.

Correspondingly, the dynamic token further includes:

the seventh processing module configured to, when the second processing module 508 triggers the first determining module 502 to determine that the set interruption flag exists and the third determining module 506 determines that the press key which is currently pressed down is left key, determine whether the left arrow on the screen is lighten, if the left arrow is not lighten, activate the key interruption and trigger the first determine module 502 to determine whether the set interruption flag exists; if the left arrow is lighten, read the data, which is adjacent to the current display information and stored in further ahead position, from the current transaction information and take the data as the not-displayed data, determine whether the length of the not-displayed data is more than the fourth preset length, if yes, select the end data with length of the fourth preset length from the not-displayed data and take the data as the current display data, stores the current display information into the display data buffer, light the right arrow on the screen, activate the key interruption and trigger the first determining module 502 to determine whether the set interruption flag exists; otherwise, store the not-displayed data into the display data buffer, light the right arrow on the screen, light off the left arrow on the screen, activate the key interruption and trigger the first determining module 502 to determine whether the set interruption flag exists;

the eighth processing module configured to, when the second processing module 508 triggers the first determining module 502 to determine that the set interruption flag exists and the third determining module 506 determines that the press key which is currently pressed down is right key, determine whether the right arrow on the screen is lighten, if the right arrow is not lighten, activate the key interruption and trigger the first determining module 502 to determine whether the set interruption flag exists; if the right arrow is lighten, read the data, which is adjacent to the current display information and stored in further end position, from the current transaction information and takes the data to be not-displayed data, determine whether the length of the not-displayed data is more than the fourth preset length, if yes, select the data, of which storage position is headmost, of the fourth preset length from not-displayed data and take the data as the current display information, store the current display information into the display data buffer, light the left arrow on the screen, activate the key interruption and trigger the first determining module 502 to determine whether the set interruption flag exists; otherwise, store the not-displayed data into the display data buffer, light the left arrow on the screen and light off the right arrow on the screen, activate the key interruption and trigger the first determining module 502 to determine whether the set interruption flag exists;

a fifth determining module configured to determine whether the time information display flag is set;

a seventh processing module specifically configured to, when the fifth determining module determines that the time information display flag is reset, the second processing module 508 triggers the first determining module 502 to determine that the set interruption flag exists and the third determining module 506 determines that the press key which is pressed down is the left key, determine whether the left arrow on the screen is lighten, if the left arrow is not lighten, activate the key interruption and trigger the first determining module 502 to determine whether the set interruption flag exists; if the left arrow is lighten, read the data, which is adjacent to the current display information and stored in further ahead position, from the current transaction information and takes the data to be not-displayed data; determine whether the length of the not-displayed data is more than the fourth preset length, if yes, select the end data with length of the fourth preset length from the not-displayed data and take the data as the current display data, store the current display information into the display data buffer, light the right arrow on the screen, activate the key interruption and trigger the first determining module 502 to determine whether the set interruption flag exists; otherwise, store the not-displayed data into the display data buffer, light the right arrow on the screen, light off the left arrow on the screen, activate the key interruption and trigger the first determining module 502 to determine whether the set interruption flag exists.

Correspondingly, the eighth processing module configured to, when the fifth determining module determines that the time information display flag is set, the second processing module 508 triggers the first determining module 502 to determine whether the set interruption flag exists and the third determining module 506 determines that when the press key which is currently pressed down is the right arrow, determine whether the right arrow on the screen is lighten, if the right arrow is not lighten, activate the press key interruption and trigger the first determining module 502 to determine whether the set interruption flag exists; if the right arrow is lighten, read the data, which is adjacent to the current display information and stored in further end position, from the current transaction information and take the data as not-displayed data, determine whether the length of the not-displayed data is more than a fourth preset length, if yes, select the headmost data with length of the fourth preset length from the not-displayed data and take the data as the current display data, store the current display information in the display data buffer, light the right arrow on the screen, activate the key interruption and trigger the first determining module 502 determines whether the set interruption flag exists; otherwise, store the not-display data into the display data buffer, light the left arrow on the screen, light off the right arrow on the screen, activate the key interruption and trigger the first determining module 502 to determine whether the set interruption flag exists.

The dynamic token further includes:

a ninth processing module specifically configured to, when the fourth determining module determines that the time information display flag is set, the second processing module 508 triggers the first determining module 502 to determine the set interruption flag exists and the third determining module 506 determines that the press key which is currently pressed down is Enter key, set the time information display flag, read the time information from the log in the log buffer, stores the read time information into the display data buffer, activate the key interruption and trigger the first determining module 502 do determine whether the set interruption flag exists.

Further, the second storing sub-module specifically is configured to the following operation:

P1) determine whether the number of logs is zero, if yes, store the newly added log into the log storage area, set the headmost log index and the last log index as the index of the newly added log, update the number of logs; otherwise, execute Step P2;

P2) determine whether the space occupied by the newly added log is more than the rest space of the log storage area, if yes, execute Step P3; otherwise, store the newly added log into the log storage area, update the number of logs and the last log index;

P3) delete the earliest stored log from the log storage area, shift the rest logs in the log storage forward, update the number of the logs and the headmost log index, go back to Step P2.

The second processing module 508 is specifically configured to execute the following operations:

H1) set the current log index as the last log index, set the read pointer as initial address of the log storage area;

H2) read a corresponding log from the log storage area according to the read pointer, determine whether the index in the read log is identical to the current log index, if yes, store the read log into the display data buffer, activate the key interruption, trigger the first determining module 502 to determine whether the set interruption flag exists; otherwise, execute Step H3;

H3) update the read pointer according to the size of the space occupied by the read log, go back to Step H2.

It should be noted that, in another embodiment of the present invention, the above second storing sub-module specifically is configured to the following operations:

G1) determine whether the space occupied by the newly added log is more than the rest space in the log storage area, if yes, execute Step G2; otherwise, execute Step G4;

G2) read a corresponding log from the log storage area according to the headmost record pointer, update the headmost record pointer and the rest space in the log storage area according to the space occupied by the read log;

G3) read the corresponding log from the log storage area according to the headmost record pointer, take the read index of the log as the headmost log index, update the number of logs and go back to Step G1;

G4) determine whether the number of logs is zero, if yes, execute Step G6; otherwise, execute Step G5;

G5) read a corresponding log from the log storage area according to the last record pointer, update the last record pointer according to the space occupied by the read log, execute Step G6;

G6) set the count value of the temporary counter as zero, set the value of the temporary pointer to be the value of the last record pointer, set the current log byte to be initial byte of the newly added log;

G7) determine whether the value of the temporary pointer is less than the size space of the log storage area, if yes, execute Step G8; otherwise, set the value of the temporary pointer to be zero, execute Step G8;

G8) store the current log byte into the position corresponding to the temporary pointer, update the temporary pointer and the count value of the temporary counter, take next byte of the current log byte as updated current log byte;

G9) determine whether the count value of the temporary counter is less than the size of the space occupied by the newly added log, if yes, go back to Step G7; otherwise, execute Step G10;

G10) set the last log index to be the index of the newly added log, update the number of logs, update the rest space in the log storage area according to the size of the space occupied by the newly added log.

In this case, the second processing module 508 reads the log corresponding to the current log index from the log storage area specifically includes that the second processing module 508 execute following operation:

K1) set the current log index to be last log index, set the value of the temporary pointer to be the value of the headmost record pointer;

K2) read the corresponding index from the log storage area according to the temporary pointer, obtain the size of the space occupied by the log corresponding to the index, determine whether the index is identical to the current log index, if yes, execute Step K4; otherwise, execute Step K3;

K3) update the temporary pointer according to the size of space occupied by the log, determine whether the value of the temporary pointer is less than the size of the space of the log storage area, if yes, go back to Step K2; otherwise, update the temporary pointer according to the size of the space of the log storage area; go back to Step K2;

K4) set the count value of the temporary counter as the size of the space occupied by the log; K5) read a byte of data from the log storage area according to the temporary pointer, update the temporary pointer and the count value of the temporary counter;

K6) determine whether the value of the temporary pointer is less than the size of the space of the log storage area, if yes, execute Step K7; otherwise, update the temporary pointer according to the size of the space of the log storage area; execute Step K7;

K7) determine whether the count value of the temporary counter is more than zero, if yes, go back to Step K5; otherwise, store the read data into the log buffer, store the time information in the read log into the display data buffer, activate the key interruption and trigger the first determining module 502 to determine whether the set interruption flag exists.

Further, the dynamic token above further includes a second obtaining module configure to, after the first obtaining module 505 obtains the first key value, obtain key pressing time length;

a sixth determining module configure to, when the third determining module 506 determines that the press key which is currently pressed down is the second press key or combination of the third press key and the fourth press key, determine whether key pressing time length obtained by the second obtaining module is less than a first preset time length;

a tenth processing module configured to, when the sixth determining module determines that the key pressing time length is less than the first preset time length, execute corresponding operation according to the press key which is currently pressed down, activate the key interruption and trigger the first determining module 502 to determine whether the set interruption flag exists;

the second processing module 508 specifically configured to, when the sixth determining module determines that the key pressing time length is not less than the first preset time length, read the log from the log storage area, store the read log into the display data buffer, activate the key interruption and trigger the first determining module 502 to determine whether the set interruption flag exists.

in this case, the first preset time length is a product of the different between the first preset value and the second preset value and the third preset time length;

Correspondingly, the resetting module 504 further configured to, when the second determining module 503 determines that the set interruption flag is the key interruption flag, reset a long-press flag;

the second obtaining module is specifically configured to, when the first obtaining module 505 obtains the first key value, execute the following operations:

S9) extent a second preset time length, store the first key value, scan the keyboard and obtain the second key value;

S10) determine whether the second key value is identical to the first key value, if yes, execute Step S11; otherwise, activate the key interruption and trigger the first determining module 502 to determine whether the set interruption flag exists;

S11) set overflow time of a timer to be a third preset time length, set the overflow times as a first preset value;

S12) activate the general interruption and time counting function of timer, switch the time source to low speed clock and enter sleep mode.

S13) after being waken up, shut off time counting function of the timer and switch the clock source to be high-speed clock;

S14) determine whether the timer interruption flag is set, if yes, execute Step S15; otherwise, go back to Step S12.

S15) determine shutting off the general interruption, reset the timer interruption flag; S16) scan the keyboard, obtain a third key value, determine whether the third key value is identical to the first key value, if yes, execute Step S17; otherwise, activate the key interruption and the general interruption, trigger the first determining module 502 to determine whether the set interruption flag exists;

S17) update the overflow times, determine whether the overflow times is the second preset value, if yes, set the long-press flag; otherwise, go back to Step S12;

the sixth determining module specifically configured to, when the third determining module 506 determines that the press key which is currently pressed down is the second press key or the combination of the third press key and the fourth press key, determine whether the long-press flag is set, if yes, determine that the key pressing time length is not less than the preset time length, otherwise, determine that the key pressing time length is less than the preset time length.

Further, the dynamic token further includes:

a seventh determining module configured to determine the system state;

an eleventh processing module configured to, when the third determining module 506 determines that the press key which is currently pressed down is power key and the seventh determining module determines that the system state is not power off state, set the system state to be power off sate, activate the key interruption and trigger the first determining module 502 to determine whether the set interruption flag exists; when the third determining module 506 determines that the press key which is currently pressed down is power key and the seventh determining module determines that the system state is power off state, update the system state;

the second processing module 508 includes an updating sub-module configured to, when the seventh determining module determines that the system state is power off state and the third determining module 506 determines that the press key which is currently pressed down is the second press key or the combination of the third press key and the fourth press key, update the system state;

a processing sub-module configured to, when the seventh determining module determines that the system state is power off state and the third determining module 506 determines that the press key which is currently pressed down is the second press key or the combination of the third press key and the fourth press key, read a log from the log storage area, store the read log into the display data buffer, activate the key interruption and trigger the first determining module 502 to determine whether the set interrupt log exists.

In this case, that the eleventh processing module updates the system state specifically includes:

that the eleventh processing module sets the system state to be authenticating token PIN state;

the dynamic token further includes:

a twelfth processing module configured to, when the seventh determining module determines that the system state is authentication token PIN state and the third determining module 506 determines that the press key which is currently pressed down is number key, execute the following operations:

B2) store the first key value in the key data buffer, update the press key data length;

B3) determine whether the press key data length is less than a first preset length, if yes, activate the key interruption and trigger the first determining module 502 to determine whether the set interruption flag exists; otherwise, execute Step B4;

B4) determine whether the data in the key data buffer is identical to the data in the password data buffer, if yes, execute Step B5; otherwise, execute Step B6;

B5) clear the press key data buffer, clear the failed times of token authentication, set the system state to be token interface state, activate the key interruption and trigger the first determining module 502 to determine whether the set interruption flag exists;

B6) clear the press key data buffer, update the failed times of token authentication; B7) determine whether the failed times of token authentication is a first preset times, if yes, execute Step B8; otherwise, execute Step B9;

B8) set the system state to be display-unlock-challenge-code-state, activate the key interruption and trigger the first determining module 502 to determine whether the set interruption flag exists;

B9) set the system state to be PIN error state, activate the key interruption and trigger the first determining module 502 to determine whether the set interruption flag exists;

a thirteenth processing module configured to, when the seventh determining module determines that the system sate is authenticating token PIN state and the third determining module 506 determines that the press key which is currently pressed down is the delete key, determine whether the press key data length is zero, if yes, activate the key interruption and trigger the first determining module 502 to determine whether the set interruption flag exists;

otherwise, delete the last time stored data from the press key data buffer, update the press key data length, activate the key interruption and trigger the first determining module 502 to determine whether the set interruption flag exists.

Specifically, the updating sub-module is configured to, when the seventh determining module determines that the system state is power off state and the third determining module 506 determines that the press key which is currently pressed down is the second press key or the combination of the third press key and the fourth press key, set the system state to be authenticating log PIN state;

Correspondingly, the dynamic token further includes:

a fourteenth processing module configured to, when the seventh determining module determines that the system state is authenticating log PIN state and the third determining module 506 determines that the press key which is currently pressed down is a number key, execute the following operations:

C2) store the first key value in the press key data buffer, updated the press key data length;

C3) determine whether the press key data length is less than the preset length, if yes, activate the key interruption and trigger the first determining module 502 to determine whether the set interruption flag exists; otherwise, execute Step C4;

C4) determine whether the data in the press key data buffer is identical to the data in the password data buffer, if yes, execute Step C5; otherwise, execute Step C6;

C5) clear the press key data buffer, clear the failed time of log authentication, set the system state to be log display state, activate the key interruption and trigger the first determining module 502 to determine whether the set interruption flag exists;

C6) clear the press key data buffer, update the failed time of log authentication; C7) determine whether the failed times of log authentication is a second preset times, if yes, execute Step C8; otherwise, execute Step C9;

C8) set the system sate to be display-unlock-challenge-code-state, activate the press key interruption and trigger the first determining module 502 to determine whether the set interruption flag exists;

C9) set the system state to be PIN error state, activate the key interruption and trigger the first determining module 502 to determine whether the set interrupt flag exists;

a fifteenth processing module configured to, when the seventh determining module determines that the system state is authentication log PIN state and the third determining module 506 determines that the press key which is currently pressed down is Delete key, determine whether the press key data length is zero, if yes, activate the key interruption and trigger the first determining module 502 to determine whether the set interruption flag exists; otherwise, delete the last time stored data from the press key data buffer, update the press key date length, activate the key interruption and trigger the first determining module 502 to determine whether the set interruption flag exists.

Further, the dynamic token further includes:

a flag bit managing module configured to, when the third determining module 506 determines that the press key which is currently pressed down is power key and the seventh determining module determines that the system state is not power off state, reset log power up flag; when the seventh determining module determines that the system state is power off and the third determining module 506 determines that the press key which is currently pressed down is the second press key or combination of the third press key and the fourth press key, set the log power up flag;

a sixteenth processing module configured to, when the third determining module 506 determines that the press key which is currently pressed down is not the power key and the seventh determining module determines that the system state is PIN error state, determine whether the log power up flag is set, if yes, set the system state to be authenticating log PIN state, activate the press key interruption and trigger the first determining module 502 to determine whether the set interruption flag exists; otherwise, set the system state to be authentication token PIN state, activate the key interruption and trigger the first determining module 502 to determine whether the set interruption flag exists.

Specifically, the eleventh processing module specifically is configured to, when the third determining module 506 determines that the press key which is pressed down is power key and the seventh determining module determines that the system state is not power off state, set the system state to be power off state, activate the key interruption and trigger the first determining module 502 to determine whether the set interruption flag exists; when the third determining module 506 determines that the press key which is currently pressed down is power key and the seventh determining module determines that the system state is power off state, determine whether the token locking flag is set, if yes, set the system state to be display-unlock-challenge-code-state, activate the key interruption and trigger the first determining module 502 to determine whether the set interruption flag exists; otherwise, set the system sate to be authentication token PIN state;

the updating sub-module specifically is configured to, when the seventh determining module determines that the system state is power off state and the third determining module 506 determines that the press key which is currently pressed down is the second press key or the combination of the third press key and the fourth press key, determine whether the log locking flag is set, if yes, set the system state to be display-unlock-challenge-code-state, activate the key interruption and trigger the first determining module 502 to determine whether the set interruption flag exists; otherwise, set the system state to be authenticating log PIN state;

the twelfth processing module further is configured to, after determining that the failed times of token authentication is a first preset times, set the token locking flag;

the fourteenth processing module further is configured to, after determining that the failed times of token authentication is the second preset times, set the token locking flag.

The dynamic token further includes:

a seventeenth processing module configured to, when the seven determining module determines that the system state is display-unlock-challenge-code-state and the third determining module 506 determines that the press key which is currently pressed down is not power key, generate the unlock challenge code set the system sate to be waiting for entering unlock code state, display the unlock challenge code, activate the key interruption and trigger the first determining module 502 to determine whether the set interruption flag exists;

the eighteenth processing module configured to, when the seventh determining module determines that the system state is waiting for entering unlock code state and when the third determining module 506 determines that the press key which is currently pressed down is number key, execute the following operations:

D2) store the first key value in the press key data buffer, update the press key data length, determine whether the press key data length is less than a second preset length, if yes, activate the key interruption and trigger the first determining module 502 to determine whether the set interruption flag exists; otherwise, execute Step D3;

D3) authenticate the data in the press key data buffer according to the unlock challenge code, if the authenticating is successful, execute Step D4; otherwise, execute Step D5;

D4) clear the press key data buffer, reset the locked token flag and the log locking flag, set the system state as a first setting PIN state, activated the key interruption and trigger the first determining module 502 to determine whether the set interruption flag exists;

D5) clear the press key data buffer, set the system state to be power off state, activate the key interruption and trigger the first determining module 502 to determine whether the set interruption flag exists;

a nineteenth processing module configured to, when the seventh determining module determines that the system sate is waiting for entering unlock code state and the third determining module 506 determines that when the press key which is currently pressed down is Delete key, determine whether the press key data length is zero, if yes, activate the key interruption and trigger the first determining module 502 to determine whether the set interruption flag exists; otherwise, delete the last time stored data from the press key data buffer, update the press key data length, activate the key interruption and trigger the first determining module 502 to determine whether the set interruption flag exists.

Specifically, the eleventh processing module is specifically configured to, when the third determining module 506 determines that the press key which is currently pressed down is power key and the seventh determining module determines that the system state is not power state and set the system state as power off state, activate the key interruption and trigger the first determining module 502 to determine whether the set interruption flag exists; when the third determining module 506 determines that the press key which is currently pressed down is power key and the seventh determining module determines that the system state is power off state, activate the key interruption and trigger the first determining module 502 to determine whether the set interruption flag exists.

Correspondingly, the dynamic token further includes:

a twentieth processing module configured to, when the seventh determining module determines that the system sate is a first setting PIN state and the third determining module 506 determines that the press key which is currently pressed down is the number key, store the first key value in the press key data buffer, update the press key date length, determine whether the press key data length is less than the first preset length, if yes, activate the press key interruption and trigger the first determining module 502 to determine whether the set interruption flag exists; otherwise, store the data in the press key data buffer into the password data buffer, clear the press key data buffer, set the system state to be a second setting PIN state, activate the key interruption, trigger the first determining module 502 to determine whether the set interruption flag exists;

a twenty first processing module configured to, when the seventh determining module determines that the system state is the first setting PIN state and the third determining module 506 determines that the press key which is currently pressed down is Delete key, determine whether the press key data length is zero, if yes, activate the key interruption and trigger the first determining module 502 to determine whether the set interruption flag exists; otherwise, delete the last stored data from the press key data buffer, update the press key data length, activate the key interruption and trigger the first determining module 502 to determine whether the set interruption flag exists;

a twenty second processing module configured to, when the seventh determining module determines that the system state is the second setting PIN state and the third determining module 506 determines that the press key which is currently pressed down is a number key, execute following operation:

F2) store a first key value into the press key data buffer, update the press key data length, determine whether the press key data length is less than a preset length, if yes, activate press key interruption and trigger the first determining module 502 to determine whether a set interruption flag exists; otherwise, execute Step F3;

F3) determine whether the data in the press key data buffer is identical to the data in the password data buffer, if yes, execute Step F5; otherwise, execute Step F4;

F4) clear the press key data buffer and the password data buffer, set the system state to be the PIN setting error state, activate the key interruption and trigger the first determining module 502 to determine whether the set interruption flag exists;

F5) determine whether the log power up log is set, if yes, execute Step F6; otherwise, execute Step F7;

F6) set the password setting flag, clear the press key data buffer, set the system state to be log display state, activate the key interruption and trigger the first determining module 502 to determine whether the set interruption flag exists;

F7) set the password setting flag, clear the password key data buffer, set the system sate to be token interface sate, initiate the first determining module 502 to determine whether the set interruption flag exists;

a twenty third processing module configured to, when the seventh determining module determines that the system state is the second setting PIN state and the third determining module 506 determines that the press key which is currently pressed down is the Delete key, determine whether the press key data length is zero, if yes, activate the key interruption, trigger the first determining module 502 to determine whether the set interruption flag exists; otherwise, delete the last time stored data from the press key data buffer, update the press key data length, activate the key interruption and trigger the first determining module 502 to determine whether the set interruption flag exists;

the twenty fourth processing module configured to, when the third determining module 506 determines that the press key which is currently pressed down is not power key and the seventh determining module determines that the system state is PIN setting error state, set the system state to be the first setting PIN state, activate the key interruption and trigger the first determining module 502 to determine whether the set interruption flag exists;

a first processing module 507 specifically configured to, when the third determining module 506 determines that the press key which is currently pressed down is a first press key and the seventh determining module determines that the system state is token interface state, generate the dynamic password and a log corresponding to the dynamic password, store the dynamic password into the display data buffer, store the log into the log storage area, initiate the key interruption and trigger the first determining module 502 to determine whether the set interruption flag exists;

a second processing module 508 specifically configure to, when the third determining module 506 determines that the press key which is currently pressed down is the second press key or the combination of the third press key and the fourth press key and the seventh determining module determines that the system state is log display state, read log from the log storage area, store the read log into the display data buffer, activate the key interruption and trigger the first determining module 502 to determine whether the set interruption flag exists.

According to the present invention, after generating the dynamic password, the dynamic token generates and records a log corresponding to the dynamic password for the user to check so as to record information related to the completed identity authentication. In this way, the user can recheck whether the completed identity authentication is completed by the dynamic token itself, therefore the security of the identity authentication mechanism using the dynamic password and the dynamic token is improved.

It can be understood that all of or part of the steps in the above embodiments can be realized by hardware, a soft module executed by a processor or combination of both. The soft module can be stored in RAM (random-access memory), memory, ROM (read-only memory), electrically programmable read-only memory, electrically erasable programmable read-only memory, register, hard disc, mobile disc, CD-ROM (Compact Disc Read-Only Memory) or any other public known forms of storage media in the prior art.

The described embodiments are only preferred embodiments of the application and the embodiments are not intended to limit the application. Any alteration or change easily obtained by those skilled in the art based on the application should fall in the scope of protection of the application.

The invention claimed is:

1. A working method for a dynamic token with log function, characterized in that said working method comprises the following steps:
    S1) powering up, by the dynamic token, executing initializing operation, initializing function of general interruption and key waking up function;
    S2) determining, by the dynamic token, whether a set interruption flag exists, if yes, executing Step S3; otherwise, keeping on executing Step S2;
    S3) determining, by the dynamic token, the set interruption flag, if the set interruption flag is timer interruption flag, executing Step S4; if the set interruption flag is key interruption flag, executing Step S5;
    S4) resetting, by the dynamic token, the timer interruption flag and going back to Step S2;
    S5) shutting down, by the dynamic token, the key interruption, scanning a keyboard and obtaining a first key value;
    S6) determining, by the dynamic token, a press key which is currently pressed down according to the first key value, if the press key which is currently pressed down is a first press key, executing Step S7; if the press key which is currently pressed down is a second press key or combination of a third press key and a fourth press key, executing Step S8;
    S7) generating, by the dynamic token, a dynamic password and a log corresponding to the dynamic password, storing the dynamic password in a display data buffer, storing the log in a log storage area, initializing the key interruption and going back to Step S2; and
    S8) reading, by the dynamic token, the log from the log storage area, storing the read log into the display data buffer, activating the key interruption and going back to Step S2.

2. The method of claim 1, wherein after determining, by the dynamic token, the press key which is currently pressed down is a second press key or combination of a third press key and a fourth press key according to the first key value, the method further comprises:
    T1) initializing, by the dynamic token, the key interruption, determining whether a set interruption flag exists, if yes, executing Step T2; otherwise, keeping on executing Step T1;
    T2) shutting down, by the dynamic token, the key interruption and scanning the keyboard after determining that the set interruption flag is key interruption flag; and
    T3, executing Step S8 after determining, by the dynamic token, that the press key which is currently pressed down is a fifth press key according to the key value obtained by scanning.

3. The method of claim 1, wherein the first press key is Enter key;
    after determining, by the dynamic token, the press key which is currently pressed down according to the first key value, the method further comprises:
    if the press key which is currently pressed down is a number key, determining, by the dynamic token, whether a press key data length is less than a third preset length, if yes, storing the first key value in a press key data buffer and the display data buffer, updating the press key data length, activating the press key interruption, going back to Step S2; otherwise, activating the key interruption, going back to Step S2;
    if the press key which is currently pressed down is delete key, determining, by the dynamic token, whether the press key data length is zero, if yes, activating the key interruption and going back to Step S2; otherwise, deleting the data which is stored the last time in the press key data buffer, updating the press key data length, deleting the data which is stored the last time in the display data buffer, activating the key interruption, going back to Step S2;
    Step S7 specifically comprises:
    determining, by the dynamic token, whether the press key data length is zero;
    if the press key data length is zero, generating, by the dynamic token, a dynamic password according to a time factor and a newly added log corresponding to the dynamic password; storing the dynamic password in the display data buffer, storing the newly added log in the log storage area, activating the press key interruption, and going back to Step S2;
    if the press key data length is not zero, taking, by the dynamic token, the data in the press key data buffer as a challenge code, generating a dynamic password and a newly added log corresponding to the dynamic password, storing the dynamic password in the display data buffer, storing the newly added log in the log storage area, activating the press key interruption and going back to Step S2.

4. The method of claim 3, wherein generating, by the dynamic token, the dynamic password and the newly added log corresponding to the dynamic password according to the time factor specifically comprises:
    generating, by the dynamic token, a time type dynamic password according to the time factor, allocating an index to the newly added log, taking the length of the time information corresponding to the time factor as length of the newly added log, combining the index, the length of the newly added log and the time information corresponding to the time factor so as to obtain the newly added log.

5. The method of claim 3, wherein, taking, by the dynamic token, the data in the press key data buffer as a challenge code, generating the dynamic password and the newly added log corresponding to the dynamic password specifically comprises:
    generating, by the dynamic token, a challenge type dynamic password according to the time factor and the challenge code, allocating an index to the newly added log, compressing transaction information corresponding to the challenge code, obtaining compressed transaction data, obtaining a sum of the length of the time information corresponding to the time factor and the length of the compressed transaction data, taking the sum as the length of the newly added log, combining the index, the length of the newly added log, the time information corresponding to the time factor and the compressed transaction data so as to obtain the newly added log.

6. The method of claim 3, wherein storing, by the dynamic token, the newly added log into the log storage area specifically comprises:
determining, by the dynamic token, whether the number of the logs is zero, if yes, storing the newly added log in the log storage area, setting both the headmost index and the last log index to be the index of the newly added log, updating the number of the logs; otherwise, storing the newly added log in the log storage area, setting the last log index as the index in the newly added log, and updating the number of logs.

7. The method of claim 6, wherein Step S8 specifically is:
setting, by the dynamic token, the current log index to be the last log index, reading a corresponding log from the log storage area according to the current log index, storing the read log into the log buffer, storing the time information in the read log into the display data buffer, activating the press key interruption and going back to Step S2.

8. The method of claim 6, wherein Step S8 specifically is:
setting, by the dynamic token, the current log index as the last log index, reading a corresponding log from the log storage area according to the current log index, decompressing the compressed transaction data from the read log, storing current transaction information obtained by decompressing in the log buffer area, determining whether the current transaction information is longer than a fourth preset length, if yes, selecting the data, of which storage position is the headmost, of the fourth preset length from the current transaction information and taking the data as the current display information, storing the current display information in the display data buffer, lighting a right arrow on a display screen, activating the key interruption and going back to Step S2; otherwise, storing the current transaction information into the display data buffer, activating the key interruption and going back to Step S2.

9. The method of claim 1, wherein after obtaining, by the dynamic token, the first key value, the method further comprises:
obtaining, by the dynamic token, a key pressing time length;
after determining, by the dynamic token, whether the press key which is currently pressed down is a second press key or combination of the third press key and the fourth press key, the method further comprises:
determining, by the dynamic token, whether the time of pressing the press key is less than a first preset time length, if yes, executing corresponding operation according to the press key which is currently pressed down, activating the key interruption and going back to Step S2; otherwise, executing Step S8.

10. The method of claim 1, wherein after determining, by the dynamic token, the press key which is currently pressed down according to the first key value, the method further comprises:
if the press key which is currently pressed down is power key and a system state is not power off state, executing Step A1; if the press key which is currently pressed down is power key and the system state is power off state, executing Step A2:
A1) setting, by the dynamic token, the system state to be power off state, activating the key interruption, going back to Step S2;

A2) updating, by the dynamic token, the system state;
before Step S8, the method further comprises:
determining, by the dynamic token, that the system state is power off sate and executing following steps:
A3) updating, by the dynamic token, the system state.

11. A dynamic token with log function, wherein said dynamic token comprises:
an initializing module configured to, after being powered up, execute initializing operation, activating general interruption and press key waking function;
a first determining module configured to determine whether a set interruption flag exists;
a second determining module configured to, after the first determining module determines that the set interruption flag exists, determine the set interruption flag;
a resetting module configured to, after the second determining module determines that the set interruption flag is timer interruption flag, reset the timer interruption flag and trigger the first determining module to determine whether the set interruption flag exists;
a first obtaining module configured to, after the second determining module determines that the set interruption flag is key interruption flag, shut down the key interruption, scan a keyboard and obtain a first key value;
a third determining module configured to determine a press key which is currently pressed down according to the first key value obtained by the first obtaining module;
a first processing module configured to, after the third determining module determines that the press key which is currently pressed down is a first press key, generate a dynamic password and a log corresponding to the dynamic password, store the dynamic password in a display data buffer, store the log in a log storage area, initialize the key interruption and trigger the first determining module to determine whether the set interruption flag exists; and
a second processing module configure to, when the third determining module determines that the press key which is currently pressed down is the second press key or combination of a third press key and a fourth press key, read a log from the log storage area, store the read log in the display data buffer, activate the key interruption and trigger the first determining module to determine whether a set interruption flag exists.

12. The dynamic token of claim 11 wherein
the second processing module is configured to, after the third determining module determines that the press key which is currently pressed down is the second press key or combination of the third press key and the fourth press key, execute the following operation:
T1) activate the key interruption, determine whether the set interruption flag exists, if yes, execute Step T2; otherwise, keep on execute Step T1;
T2) after determining that the set key interruption flag is press key interruption flag, shut down the key interruption, scan the keyboard; and
T3) after determining that the press key which is currently pressed down is a fifth press key according the key value obtained by scanning, read the log from the log storage area, store the read log in the display data buffer, activate the key interruption and trigger the first determining module to determine whether the set interruption flag exists.

13. The dynamic token of claim 11, wherein the first press key is Enter key;
the dynamic token further comprises:

a third processing module configured to, when the third determining module determines that the press key which is currently pressed down is a number key, determine whether the press key data length is less than a third preset length; if yes, store the first key value into a press key data buffer and a display data buffer, update the press key data length, activate the key interruption and trigger the first determine module to determine whether the set interrupt flag exists; otherwise, activate the key interruption and trigger the first determining module to determine whether the set interrupt flag exists;

when the third determining module determines that the press key which is currently pressed down is delete key, determine whether the press key data length is zero, if yes, activate the press key interruption and trigger the first determine module to determine whether the set interrupt flag exists; otherwise, delete the last time stored data from the press key data buffer, update the press key data length, delete the last time stored data from the display data buffer, activate the key interruption and trigger the first determining module to determine whether the set interruption flag exists;

the first processing module comprises:

a first determining sub-module configured to, when the third determining module determines that the press key which is currently pressed down is Enter key, determine whether the press key data length is zero;

a first generating sub-module configured to, when the first determining module determines that the press key data length is zero, generate a dynamic password according to the time factor and a newly added log corresponding to the dynamic password;

a second generating sub-module configured to, when the first determining module determines that the press key data length is not zero, take the data in the press key data buffer as the challenge code, generate the dynamic password and the newly added log corresponding to the dynamic password;

a first storing sub-module configured to store the dynamic passwords generated by the first generating sub-module and the second generating sub-module into the display data buffer;

a second storing sub-module configured to store the newly added log generated by the first generating sub-module and the second generating sub-module into the log storage area; and an activating sub-module configured to, after the first generating sub-module or the second generating sub-module generate the dynamic passwords and the newly added log, activate the press key interruption, and trigger the first determining module determines whether a set interrupt log exists.

14. The dynamic token of claim 13, wherein
the first generating sub-module is configured to, when the first determining sub-module determines that the press key data length is zero, allocate an index to the newly added log according to a time type dynamic password generated according to time factor, take length of time information corresponding to the time factor as length of the newly added log; combine the index, the length of the newly added log and the time information corresponding to the time factor so as to obtain the newly added log.

15. The dynamic token of claim 13, wherein
the second generating sub-module is configured to, when the first determining sub-module determines that the press key data length is not zero, generate a challenge type dynamic password according to the time factor and the challenge code, allocate an index to the newly added log, compress transaction information corresponding to the challenge code to obtain compressed transaction data, obtain a sum of length of time information corresponding to the time factor and the length of the compressed transaction data and take the sum as the length of the newly added log, combine the index, the length of the newly added log, time information corresponding to time factor and the compressed transaction data so as to obtain the newly added log.

16. The dynamic token of claim 13, wherein
the second storing sub-module is configured to determine whether number of logs is zero, if yes, store the newly added log into the log storage area, set both the headmost log index and the last log index to be the index of the newly added log, update the number of logs; otherwise, store the newly added log into the log storage area, set the last log index to be the index of the newly added log, and update the number of the logs.

17. The dynamic token of claim 16, wherein
the second processing module is configured to set the current log index as the last log index, read a corresponding log from the log storage area according to the current log index, store the read log into the log buffer, store the time information of the read log into the display data buffer, activate the key interrupt and trigger the first determining module to determine whether the set interruption flag exists.

18. The dynamic token of claim 16, wherein
the second processing module is configured to, when the third determining module determines that the press key which is currently pressed down is the second press key or combination of the third press key and the fourth press key, set the current log index as the last log index, read a corresponding log from the log storage area according to the current log index, decompress the compressed transaction data from the read log, store the current transaction information obtained by decompressing into the log buffer, determine whether the current transaction information is longer than a fourth preset length, if yes, select the data, of which storage position is the headmost, of the fourth preset length from the current transaction information and take the data as the current display information, store the current display information in the display data buffer, light a right arrow on a display screen, activate the key interruption and trigger the first determining module to determine whether the set interruption flag exists; otherwise, store the current transaction information into the display data buffer, activate the key interruption and trigger the first determining module to determine whether the set interruption flag exists.

19. The dynamic token of claim 11, wherein the dynamic token further comprises:
a second obtaining module configured to, after the first obtaining module obtains the first key value, obtain the key pressing time length;
a sixth determining module configured to, after the third determining module determines that the press key which is currently pressed down is the second press key or combination of the third press key and the fourth press key, determine whether the time length of the press key obtained by the second obtaining module is less than the first preset time length;

a tenth processing module configured to, when the sixth determining module determines that the key pressing time length is less than a first preset time length, execute corresponding operation according to the press key which is currently pressed down, activate the key interruption and trigger the first determining module to determine whether the set interruption flag exists; and the second processing module configured to, when the sixth determining module determines that the key pressing time length is not less than the first preset time length, read the log from the log storage area, store the read log into the display data buffer, activate the key interruption and trigger the first determining module to determine whether the set interrupt flag exists.

20. The dynamic token of claim 11, wherein the dynamic token further comprises:

a seventh determining module configured to determine a system state;

an eleventh processing module configured to, when the third determining module determines that the press key which is currently pressed down is power key and the seventh determining module determines that the system state is not power off state, set the system state to be power off sate, activate the key interruption and trigger the first determining module to determine whether the set interruption flag exists;

when the third determining module determines that the press key which is currently pressed down is power key and the seventh determining module determines that the system state is power off state, update the system state; and the second processing module comprises:

an updating sub-module configured to, when the seventh determining module determines that the system state is power off state and the third determining module determines that the press key which is currently pressed down is the second press key or combination of the third press key and the fourth press key, update the system state; and a processing sub-module configured to, when the seventh determining module determines that the system state is power off state and the third determining module determines that the press key which is currently pressed down is the second press key or combination of the third press key and the fourth press key, read a log from the log storage area, store the read log into the display data buffer, activate the key interruption and trigger the first determining module to determine whether the set interrupt log exists.

* * * * *